(12) United States Patent
Peña et al.

(10) Patent No.: US 12,272,977 B2
(45) Date of Patent: Apr. 8, 2025

(54) MODULAR UNIT WITH INTEGRATED BATTERY CHARGER

(71) Applicant: Milwaukee Electric Tool Corporation, Brookfield, WI (US)

(72) Inventors: Matthew J. Peña, Wauwatosa, WI (US); Cameron R. Schulz, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 713 days.

(21) Appl. No.: 17/505,273

(22) Filed: Oct. 19, 2021

(65) Prior Publication Data

US 2022/0109314 A1  Apr. 7, 2022

Related U.S. Application Data

(63) Continuation of application No. PCT/US2021/053557, filed on Oct. 5, 2021.

(60) Provisional application No. 63/157,164, filed on Mar. 5, 2021, provisional application No. 63/088,291, filed on Oct. 6, 2020.

(51) Int. Cl.
  *H02J 7/00* (2006.01)

(52) U.S. Cl.
  CPC .......... *H02J 7/0045* (2013.01); *H02J 7/0013* (2013.01); *H02J 7/0024* (2013.01)

(58) Field of Classification Search
  CPC ....... H02J 7/0013; H02J 7/0024; H02J 7/0045
  USPC .......................... 320/107, 112, 113, 114, 115
  See application file for complete search history.

(56) References Cited

U.S. PATENT DOCUMENTS

| | | | |
|---|---|---|---|
| 3,424,334 | A | 1/1969 | Goltz |
| 3,634,732 | A | 1/1972 | Finger et al. |
| 3,950,701 | A | 4/1976 | Matuoka et al. |
| 5,810,168 | A | 9/1998 | Eggering |
| 5,890,613 | A | 4/1999 | Williams |
| 6,982,541 | B2 | 1/2006 | Zick et al. |
| 6,983,946 | B2 | 1/2006 | Sullivan et al. |
| 7,332,889 | B2 | 2/2008 | Glasgow et al. |
| 7,471,063 | B2 | 12/2008 | Zick et al. |
| 7,519,195 | B2 | 4/2009 | Hesketh |
| 7,557,537 | B2 | 7/2009 | Zick et al. |
| 7,609,027 | B2 | 10/2009 | Zick et al. |
| 7,835,534 | B2 | 11/2010 | Cole, Jr. et al. |

(Continued)

FOREIGN PATENT DOCUMENTS

| | | |
|---|---|---|
| CN | 204119137 | 1/2015 |
| CN | 104669226 | 6/2015 |

(Continued)

OTHER PUBLICATIONS

International Search Report and Written Opinion for International Application No. PCT/US2020/046359, dated Nov. 25, 2020, 11 pages.

(Continued)

*Primary Examiner* — Edward Tso
*Assistant Examiner* — Aaron Piggush
(74) *Attorney, Agent, or Firm* — Reinhart Boerner Van Deuren s.c.

(57) ABSTRACT

A stackable storage device, container or unit is provided. The storage device includes a storage compartment and an interface to recharge rechargeable batteries for power tools. The storage device is stackable within a modular storage system.

18 Claims, 19 Drawing Sheets

(56) References Cited

U.S. PATENT DOCUMENTS

| | | |
|---|---|---|
| 7,868,590 B2 | 1/2011 | Zick et al. |
| 8,203,307 B2 | 6/2012 | Zick et al. |
| 8,415,921 B1 | 4/2013 | Castellanos et al. |
| 8,415,924 B2 | 4/2013 | Matthias et al. |
| 8,567,796 B2 | 10/2013 | Bar-Erez et al. |
| 8,604,752 B2 | 12/2013 | Cole, Jr. et al. |
| 8,740,010 B1 | 6/2014 | Page |
| 8,842,427 B2 | 9/2014 | Yoshimura et al. |
| 8,890,478 B2 | 11/2014 | Matthias et al. |
| 8,907,623 B2 | 12/2014 | Saur |
| 8,929,579 B2 | 1/2015 | Kalyuzhny et al. |
| 8,936,258 B2 | 1/2015 | Bar-Erez et al. |
| 9,112,356 B2 | 8/2015 | Cover |
| 9,132,543 B2 | 9/2015 | Bar-Erez et al. |
| 9,313,907 B2 | 4/2016 | Heimerl |
| 9,375,835 B1 | 6/2016 | Lin |
| 9,381,640 B2 | 7/2016 | Van Der Linde et al. |
| 9,566,990 B2 | 2/2017 | Bar-Erez et al. |
| 9,643,629 B2 | 5/2017 | Bar-Erez et al. |
| 9,716,522 B2 | 7/2017 | Yildirim et al. |
| 9,834,337 B2 | 12/2017 | Roehm |
| 9,914,210 B1 | 3/2018 | Liu |
| 10,021,480 B2 | 7/2018 | Lobisser et al. |
| 10,293,476 B2 | 5/2019 | Fleischmann |
| 10,324,133 B2 | 6/2019 | Zeng |
| 10,574,067 B1 | 2/2020 | Hanson |
| 10,583,962 B2 | 3/2020 | Brunner et al. |
| 10,618,692 B2 * | 4/2020 | Hori ............... B65D 25/04 |
| 10,651,664 B2 * | 5/2020 | Sergyeyenko ........ H02J 7/0045 |
| 10,750,833 B2 | 8/2020 | Burchia |
| 2003/0139080 A1 | 7/2003 | Lafragette et al. |
| 2005/0273325 A1 | 12/2005 | Frey et al. |
| 2006/0006838 A1 | 1/2006 | Clarke |
| 2007/0138041 A1 | 6/2007 | Welsh |
| 2007/0182368 A1 | 8/2007 | Yang |
| 2008/0025544 A1 | 1/2008 | Maldonado |
| 2010/0085745 A1 | 4/2010 | Charriez et al. |
| 2010/0231161 A1 | 9/2010 | Brown |
| 2011/0260588 A1 | 10/2011 | Lin |
| 2013/0048631 A1 | 2/2013 | Van Der Linde et al. |
| 2013/0051080 A1 | 2/2013 | Van Der Linde et al. |
| 2013/0058711 A1 | 3/2013 | Van Der Linde et al. |
| 2013/0127129 A1 | 5/2013 | Bensman et al. |
| 2013/0134276 A1 | 5/2013 | Van Der Linde et al. |
| 2013/0156251 A1 | 6/2013 | Noble |
| 2013/0176688 A1 | 7/2013 | Shen et al. |
| 2013/0183562 A1 | 7/2013 | Workman et al. |
| 2014/0265440 A1 | 9/2014 | Chen et al. |
| 2014/0361740 A1 * | 12/2014 | Suzuki ............... H02J 7/0013 320/108 |
| 2015/0008879 A1 * | 1/2015 | Schneider ............ H02J 7/0024 320/110 |
| 2015/0078811 A1 | 3/2015 | Van Der Linde et al. |
| 2015/0171632 A1 | 6/2015 | Fry et al. |
| 2017/0063114 A1 | 3/2017 | Briere |
| 2017/0125886 A1 | 5/2017 | Stern et al. |
| 2017/0151972 A1 | 6/2017 | Bar-Erez et al. |
| 2017/0166352 A1 | 6/2017 | Hoppe et al. |
| 2017/0217464 A1 | 8/2017 | Bar-Erez et al. |
| 2017/0257958 A1 | 9/2017 | Sabbag et al. |
| 2017/0259956 A1 | 9/2017 | Hori et al. |
| 2018/0034015 A1 * | 2/2018 | Krantz ............... H02J 7/0031 |
| 2018/0034282 A1 | 2/2018 | Zhang et al. |
| 2018/0062145 A1 | 3/2018 | Yang |
| 2018/0161975 A1 | 6/2018 | Brunner |
| 2018/0183250 A1 | 6/2018 | Byrne et al. |
| 2018/0186513 A1 | 7/2018 | Brunner |
| 2019/0058339 A1 | 2/2019 | Sergyeyenko |
| 2019/0225371 A1 * | 7/2019 | Hoppe ............... B25H 3/023 |
| 2019/0356147 A1 | 11/2019 | Mueckl et al. |
| 2020/0147781 A1 | 5/2020 | Squiers et al. |
| 2020/0165036 A1 | 5/2020 | Squiers et al. |

FOREIGN PATENT DOCUMENTS

| | | |
|---|---|---|
| CN | 204425843 | 6/2015 |
| CN | 206211558 | 5/2017 |
| CN | 206313514 | 7/2017 |
| CN | 206465063 | 9/2017 |
| CN | 207184746 | 4/2018 |
| CN | 208149497 | 11/2018 |
| CN | 109617218 | 4/2019 |
| CN | 208697388 | 4/2019 |
| CN | 210436119 | 5/2020 |
| DE | 9411582 | 11/1995 |
| DE | 10053853 | 5/2002 |
| DE | 10115020 | 10/2002 |
| DE | 102008052158 | 4/2010 |
| DE | 102009027571 A1 | 5/2011 |
| DE | 102012213047 | 1/2014 |
| DE | 102012220837 | 5/2014 |
| DE | 202014103695 | 12/2014 |
| DE | 102017211006 | 1/2019 |
| DE | 102018102982 | 8/2019 |
| EP | 0 394 053 | 10/1993 |
| EP | 1724069 A2 | 11/2006 |
| EP | 2537641 B1 | 9/2016 |
| EP | 2338650 B1 | 10/2016 |
| GB | 2211486 | 7/1989 |
| KR | 10-2000-0073212 | 12/2000 |
| WO | WO9839831 | 9/1998 |
| WO | WO11151110 | 12/2011 |
| WO | WO 2012/071607 | 6/2012 |
| WO | WO14070858 | 5/2014 |
| WO | WO2014/125484 | 8/2014 |
| WO | WO 2014/188771 | 2/2017 |
| WO | WO2021/034658 | 2/2021 |

OTHER PUBLICATIONS

International Search Report and Written Opinion for International Application No. PCT/US2021/053557, dated Jan. 27, 2022, 9 pages.
Inter Partes Review No. 2024-01400, "Petition for Inter Partes Review of U.S. Pat. No. 11,365,026" Filed Sep. 17, 2024, 147 pages.
Exhibit 1001 in "Petition for Inter Partes Review of U.S. Pat. No. 11,365,026" Filed Sep. 17, 2024, 66 pages.
Exhibit 1002 in "Petition for Inter Partes Review of U.S. Pat. No. 11,365,026" Filed Sep. 17, 2024, 324 pages.
Exhibit 1003 in "Petition for Inter Partes Review of U.S. Pat. No. 11,365,026" Filed Sep. 17, 2024, 139 pages.
Exhibit 1004 in "Petition for Inter Partes Review of U.S. Pat. No. 11,365,026" Filed Sep. 17, 2024, 17 pages.
Exhibit 1005 in "Petition for Inter Partes Review of U.S. Pat. No. 11,365,026" Filed Sep. 17, 2024, 9 pages.
Exhibit 1006 in "Petition for Inter Partes Review of U.S. Pat. No. 11,365,026" Filed Sep. 17, 2024, 21 pages.
Exhibit 1007 in "Petition for Inter Partes Review of U.S. Pat. No. 11,365,026" Filed Sep. 17, 2024, 16 pages.
Exhibit 1008 in "Petition for Inter Partes Review of U.S. Pat. No. 11,365,026" Filed Sep. 17, 2024, 31 pages.
Exhibit 1009 in "Petition for Inter Partes Review of U.S. Pat. No. 11,365,026" Filed Sep. 17, 2024, 6 pages.
Exhibit 1010 in "Petition for Inter Partes Review of U.S. Pat. No. 11,365,026" Filed Sep. 17, 2024, 4 pages.
Exhibit 1011 in "Petition for Inter Partes Review of U.S. Pat. No. 11,365,026" Filed Sep. 17, 2024, 16 pages.
Exhibit 1012 in "Petition for Inter Partes Review of U.S. Pat. No. 11,365,026" Filed Sep. 17, 2024, 8 pages.
Exhibit 1013 in "Petition for Inter Partes Review of U.S. Pat. No. 11,365,026" Filed Sep. 17, 2024, 19 pages.
Exhibit 1014 in "Petition for Inter Partes Review of U.S. Pat. No. 11,365,026" Filed Sep. 17, 2024, 35 pages.
Exhibit 1015 in "Petition for Inter Partes Review of U.S. Pat. No. 11,365,026" Filed Sep. 17, 2024, 11 pages.
Exhibit 1016 in "Petition for Inter Partes Review of U.S. Pat. No. 11,365,026" Filed Sep. 17, 2024, 193 pages.

(56) References Cited

OTHER PUBLICATIONS

Exhibit 1017 in "Petition for Inter Partes Review of U.S. Pat. No. 11,365,026" Filed Sep. 17, 2024, 29 pages.
Exhibit 1018 in "Petition for Inter Partes Review of U.S. Pat. No. 11,365,026" Filed Sep. 17, 2024, 15 pages.
Exhibit 1019 in "Petition for Inter Partes Review of U.S. Pat. No. 11,365,026" Filed Sep. 17, 2024, 19 pages.
Exhibit 1020 in "Petition for Inter Partes Review of U.S. Pat. No. 11,365,026" Filed Sep. 17, 2024, 18 pages.
Exhibit 1021 in "Petition for Inter Partes Review of U.S. Pat. No. 11,365,026" Filed Sep. 17, 2024, 313 pages.
Exhibit 1030 in "Petition for Inter Partes Review of U.S. Pat. No. 11,365,026" Filed Sep. 17, 2024, 95 pages.
Exhibit 1031 in "Petition for Inter Partes Review of U.S. Pat. No. 11,365,026" Filed Sep. 17, 2024, 5 pages.
Exhibit 1032 in "Petition for Inter Partes Review of U.S. Pat. No. 11,365,026" Filed Sep. 17, 2024, 19 pages.
Inter Partes Review No. 2024-01401, "Petition for Inter Partes Review of U.S. Pat. No. 11,794,952" Filed Sep. 17, 2024, 165 pages.
Exhibit 1001 in "Petition for Inter Partes Review of U.S. Pat. No. 11,794,952" Filed Sep. 17, 2024, 67 pages.
Exhibit 1002 Part 1 in "Petition for Inter Partes Review of U.S. Pat. No. 11,794,952" Filed Sep. 17, 2024, 227 pages.
Exhibit 1002 Part 2 in "Petition for Inter Partes Review of U.S. Pat. No. 11,794,952" Filed Sep. 17, 2024, 278 pages.
Exhibit 1003 in "Petition for Inter Partes Review of U.S. Pat. No. 11,794,952" Filed Sep. 17, 2024, 168 pages.
Exhibit 1004 in "Petition for Inter Partes Review of U.S. Pat. No. 11,794,952" Filed Sep. 17, 2024, 17 pages.
Exhibit 1005 in "Petition for Inter Partes Review of U.S. Pat. No. 11,794,952" Filed Sep. 17, 2024, 9 pages.
Exhibit 1006 in "Petition for Inter Partes Review of U.S. Pat. No. 11,794,952" Filed Sep. 17, 2024, 21 pages.
Exhibit 1007 in "Petition for Inter Partes Review of U.S. Pat. No. 11,794,952" Filed Sep. 17, 2024, 16 pages.
Exhibit 1008 in "Petition for Inter Partes Review of U.S. Pat. No. 11,794,952" Filed Sep. 17, 2024, 31 pages.
Exhibit 1009 in "Petition for Inter Partes Review of U.S. Pat. No. 11,794,952" Filed Sep. 17, 2024, 6 pages.
Exhibit 1010 in "Petition for Inter Partes Review of U.S. Pat. No. 11,794,952" Filed Sep. 17, 2024, 4 pages.
Exhibit 1011 in "Petition for Inter Partes Review of U.S. Pat. No. 11,794,952" Filed Sep. 17, 2024, 16 pages.
Exhibit 1012 in "Petition for Inter Partes Review of U.S. Pat. No. 11,794,952" Filed Sep. 17, 2024, 8 pages.
Exhibit 1013 in "Petition for Inter Partes Review of U.S. Pat. No. 11,794,952" Filed Sep. 17, 2024, 19 pages.
Exhibit 1014 in "Petition for Inter Partes Review of U.S. Pat. No. 11,794,952" Filed Sep. 17, 2024, 35 pages.
Exhibit 1015 in "Petition for Inter Partes Review of U.S. Pat. No. 11,794,952" Filed Sep. 17, 2024, 11 pages.
Exhibit 1016 in "Petition for Inter Partes Review of U.S. Pat. No. 11,794,952" Filed Sep. 17, 2024, 193 pages.
Exhibit 1017 in "Petition for Inter Partes Review of U.S. Pat. No. 11,794,952" Filed Sep. 17, 2024, 29 pages.
Exhibit 1018 in "Petition for Inter Partes Review of U.S. Pat. No. 11,794,952" Filed Sep. 17, 2024, 15 pages.
Exhibit 1019 in "Petition for Inter Partes Review of U.S. Pat. No. 11,794,952" Filed Sep. 17, 2024, 19 pages.
Exhibit 1020 in "Petition for Inter Partes Review of U.S. Pat. No. 11,794,952" Filed Sep. 17, 2024, 18 pages.
Exhibit 1021 in "Petition for Inter Partes Review of U.S. Pat. No. 11,794,952" Filed Sep. 17, 2024, 313 pages.
Exhibit 1022 in "Petition for Inter Partes Review of U.S. Pat. No. 11,794,952" Filed Sep. 17, 2024, 324 pages.
Exhibit 1023 in "Petition for Inter Partes Review of U.S. Pat. No. 11,794,952" Filed Sep. 17, 2024, 5 pages.
Exhibit 1024 in "Petition for Inter Partes Review of U.S. Pat. No. 11,794,952" Filed Sep. 17, 2024, 7 pages.
Exhibit 1025 in "Petition for Inter Partes Review of U.S. Pat. No. 11,794,952" Filed Sep. 17, 2024, 15 pages.
Exhibit 1026 in "Petition for Inter Partes Review of U.S. Pat. No. 11,794,952" Filed Sep. 17, 2024, 37 pages.
Exhibit 1027 in "Petition for Inter Partes Review of U.S. Pat. No. 11,794,952" Filed Sep. 17, 2024, 7 pages.
Exhibit 1028 in "Petition for Inter Partes Review of U.S. Pat. No. 11,794,952" Filed Sep. 17, 2024, 33 pages.
Exhibit 1030 in "Petition for Inter Partes Review of U.S. Pat. No. 11,794,952" Filed Sep. 17, 2024, 95 pages.
Exhibit 1031 in "Petition for Inter Partes Review of U.S. Pat. No. 11,794,952" Filed Sep. 17, 2024, 5 pages.
Exhibit 1032 in "Petition for Inter Partes Review of U.S. Pat. No. 11,794,952" Filed Sep. 17, 2024, 60 pages.

* cited by examiner

MODULAR UNIT WITH INTEGRATED
BATTERY CHARGER

CROSS-REFERENCE TO RELATED PATENT
APPLICATION

The present application is a continuation of International Application No. PCT/US2021/053557, filed Oct. 5, 2021, which claims the benefit of and priority to U.S. Provisional Application No. 63/157,164, filed on Mar. 5, 2021, and U.S. Provisional Application No. 63/088,291, filed on Oct. 6, 2020, both of which are incorporated herein by reference in their entirety.

BACKGROUND OF THE INVENTION

The present disclosure is directed generally to the field of tool storage systems and related devices. The present disclosure relates specifically to tool storage container with a coupling mechanism to detachably couple the tool storage container to another such container and that includes a panel configured to provide electricity to charge a battery, and Tool storage units are often used to transport tools and tool accessories. Some storage units are designed to incorporate into a modular storage system. Within a modular storage system, different units, devices and/or containers may provide varying functions, such as recharging batteries.

SUMMARY OF THE INVENTION

One embodiment of the invention relates to a charging device including a housing, a power input, a bottom surface defined by the housing, a plurality of coupling components extending from the bottom surface, and a first power tool battery interface configured to physically couple with a rechargeable power tool battery and to receive power from the power input. The power input extends from the housing and is configured to receive alternating current electricity. Each of the plurality of coupling components includes a ledge defining an upper surface that faces upward towards the bottom surface.

Another embodiment of the invention relates to a charging device including a housing, a power input, a bottom surface defined by the housing, a plurality of coupling components extending from the bottom surface, a latch, and a power tool battery interface. The power input extends from the housing and is configured to receive electricity. The plurality of coupling components are configured to slideably engage with a modular unit. The latch is slideably coupled to the housing. The latch actuates between a locked position and an unlocked position. The latch restricts the plurality of coupling components from slideably disengaging from the modular unit when the latch is positioned in the locked position. The power tool battery interface is configured to physically couple with a rechargeable power tool battery and to receive power from the power input.

Another embodiment of the invention relates to a charging device including a housing, a power input coupled to the housing, a bottom surface defined by the housing, a plurality of coupling components, a latch, and a plurality of power tool battery interfaces. The plurality of coupling components extend from the bottom surface and are configured to slideably engage with a modular unit. The latch is slideably coupled to the housing. The latch actuates between a locked position and an unlocked position. The latch restricts the plurality of coupling components from slideably disengaging from the modular unit when the latch is positioned in the locked position. The plurality of power tool battery interfaces are each configured to physically couple with a rechargeable power tool battery and to receive power from the power input. The plurality of power tool battery interfaces include a first subset of power tool battery interfaces and a second subset of power tool battery interfaces distinct from the first subset. The first subset receive power in parallel with the second subset, and the power tool battery interfaces within the first subset receive power in series with respect to each other.

One embodiment of the invention relates to a tool storage device that includes a housing, a storage compartment within the housing, a top surface including coupling components that couple the top surface of the power unit to a bottom surface of another storage device, a power input, such as to receive AC power from an electrical outlet, and a battery interface electrically coupled to the power input. The battery interface is configured to recharge a rechargeable power tool battery with power received from the power input. In a specific embodiment, the storage device includes two different battery interfaces configured to recharge different types of batteries, such as different types of rechargeable batteries used by power tools. In a specific embodiment, the storage device includes a power outlet electrically coupled to the power input, such as a USB power outlet.

Additional features and advantages will be set forth in the detailed description which follows, and, in part, will be readily apparent to those skilled in the art from the description or recognized by practicing the embodiments as described in the written description included, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

DETAILED DESCRIPTION

Figure 1:
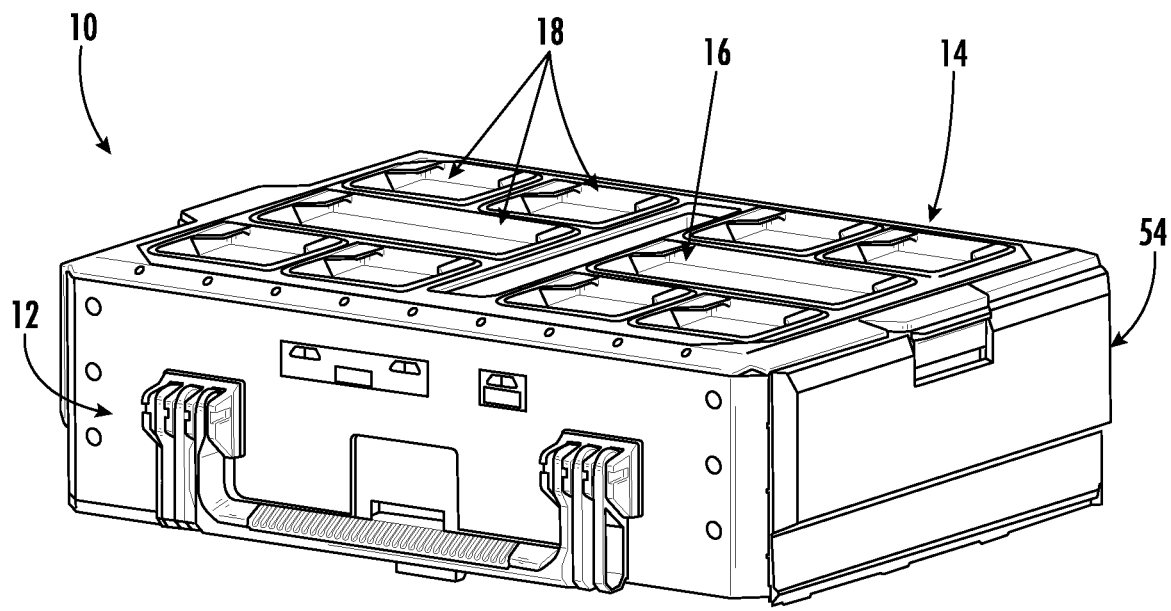
FIG. 1 is a perspective view of a storage device, according to an exemplary embodiment.
Figure 2:
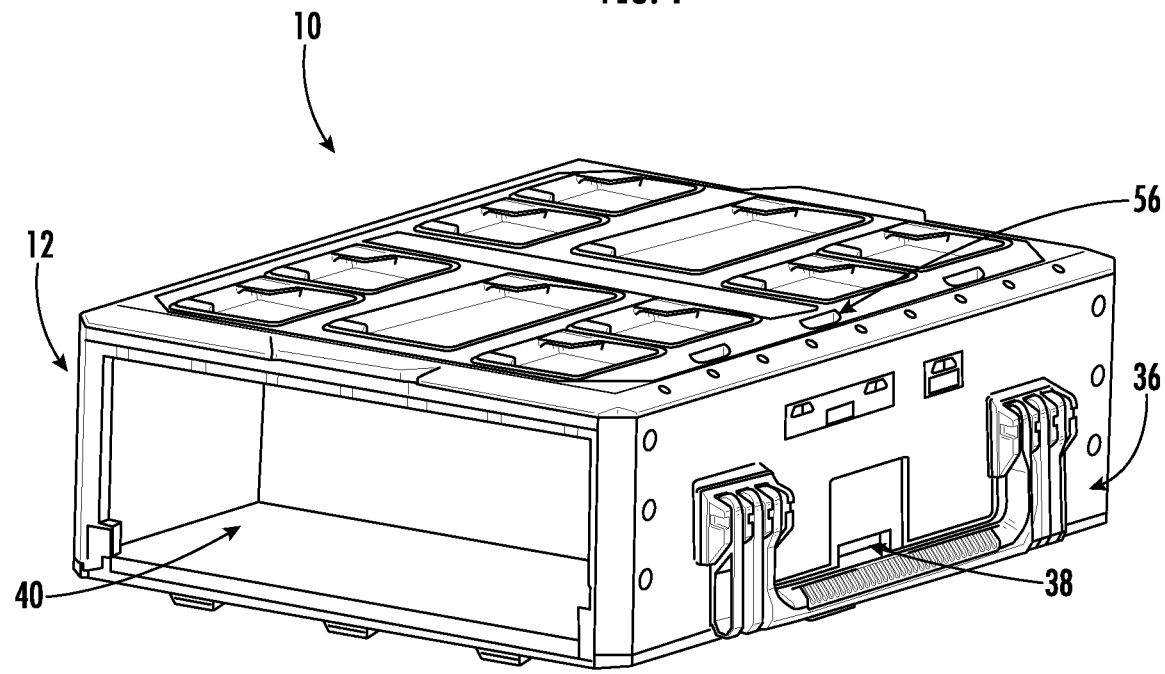
FIG. 2 is a perspective view of the storage device of FIG. 1, according to an exemplary embodiment.
Figure 3:
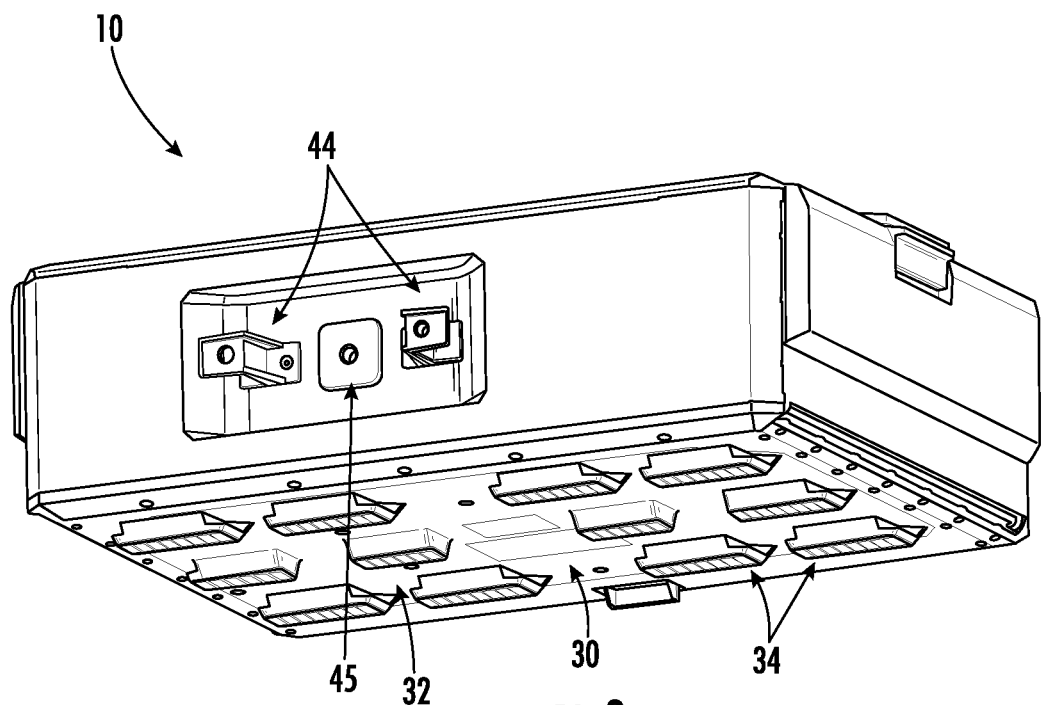
FIG. 3 is a perspective view of the storage device of FIG. 1, according to an exemplary embodiment.

Referring generally to the figures, various embodiments of a stackable storage device, container or unit are shown. One or more of the devices are configured to selectively couple and decouple with tool storage units. The storage device includes one or more interfaces to charge rechargeable batteries, such as are used by power tools. The storage device includes one or more storage compartments for tools and/or personal devices, such cell phones.

Referring to FIGS. 1-5, a container and/or device, such as storage device 10, is shown according to an exemplary embodiment. Top panel 14 is coupled to housing 12. Top panel 14 includes top surface 16, and coupling components 18. Coupling components 18 couple storage device 10 to other objects, such as devices, containers, and storage units. A coupling component, shown as latch 38, further secures storage device 10. Recess 56 receives a corresponding latch (e.g., similar to latch 38) on another object to which the storage device 10 is being coupled. Bottom panel 30 is coupled to housing 12. Bottom panel 30 includes bottom surface 32 and coupling components 34. In a specific embodiment, coupling components 18, coupling components 34, latch 38 and recess 56 are compatible with the coupling mechanism(s) described in International Patent Application No. PCT/US2018/044629.

Handle 36 is pivotally coupled to housing 12, and can be used to carry and/or move storage device 10. Storage compartment 40 is defined by housing 12. Storage compartment 40 is usable to store tools, equipment, supplies, inventory, etc. Power is received by storage device 10 through power input 45, such as a power cord. Power cord and power input 45 may be configured to receive power from an external power supply such as an AC power supply. The power cord can be stored by wrapping around protrusions 44 when power cord is not in use.

Figure 4:
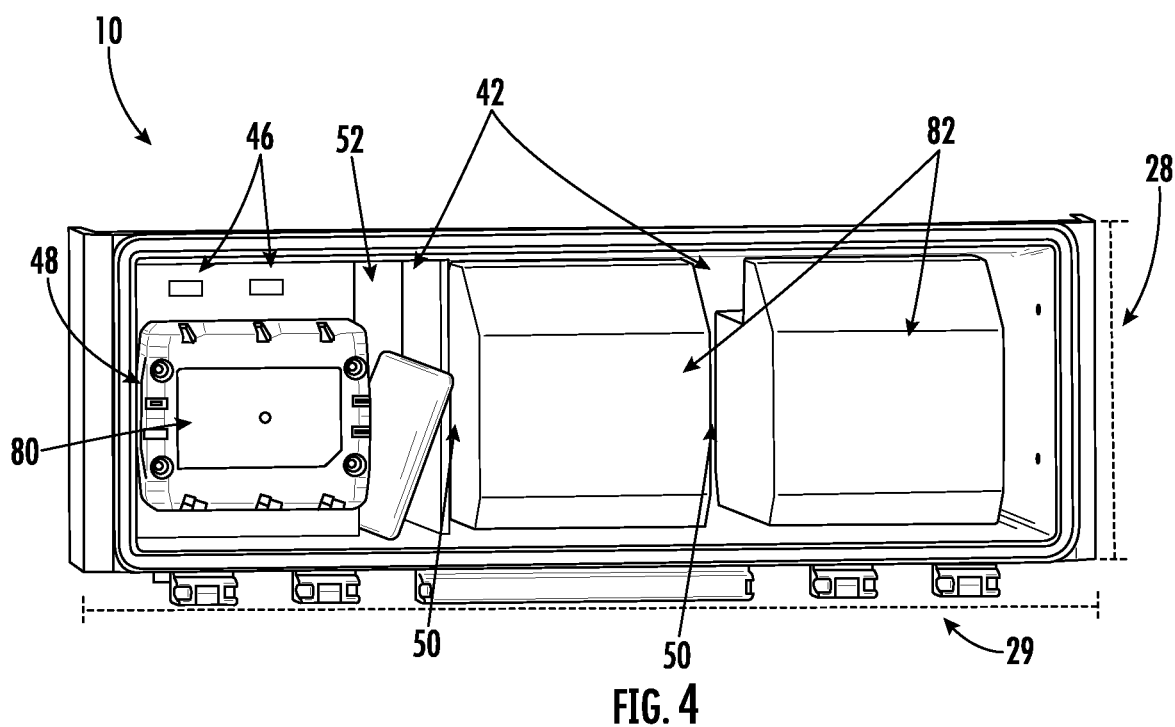
FIG. 4 is a side view of the storage device of FIG. 1, according to an exemplary embodiment.
Figure 5:
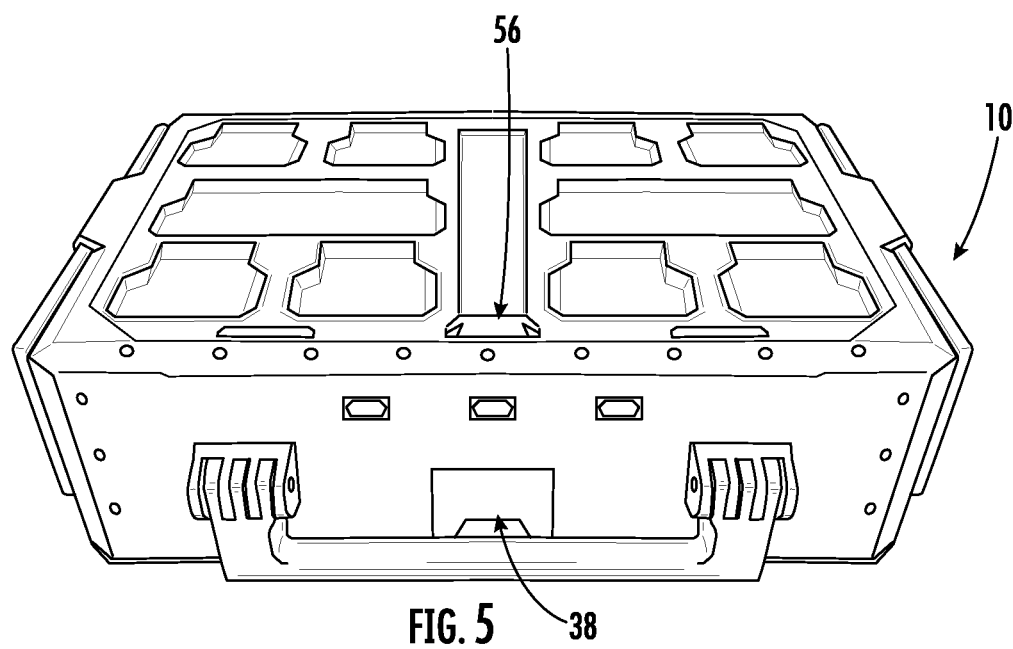
FIG. 5 is a perspective view of the storage device of FIG. 1, according to an exemplary embodiment.

A wall structure, shown as side panel 54 (shown in FIG. 2), encloses charging bay 42 (shown in FIG. 4). Charging bay 42 includes first battery charging interface 48 and second battery charging interface 50, which is different from first battery charging interface 48. First battery charging interface 48 is configured to couple to first battery 80, such as a rechargeable power tool battery. Second battery charging interface 50 is configured to couple to second battery 82, such as a rechargeable power tool battery, which is different than first battery 80. In a specific embodiment first battery 80 is compatible with the M12™ system of Milwaukee Tool™, and second battery 82 is compatible with the M18™ system of Milwaukee Tool™, Charging bay 42 includes outlets, shown as USB power outlets 46. USB power outlets 46 receive USB cables to charge devices, such as personal electronics like cellular phones. Storage compartment 52 is useable to housing equipment, tools, and/or other objects, such as a cell phone (shown in FIG. 4).

Figure 6:
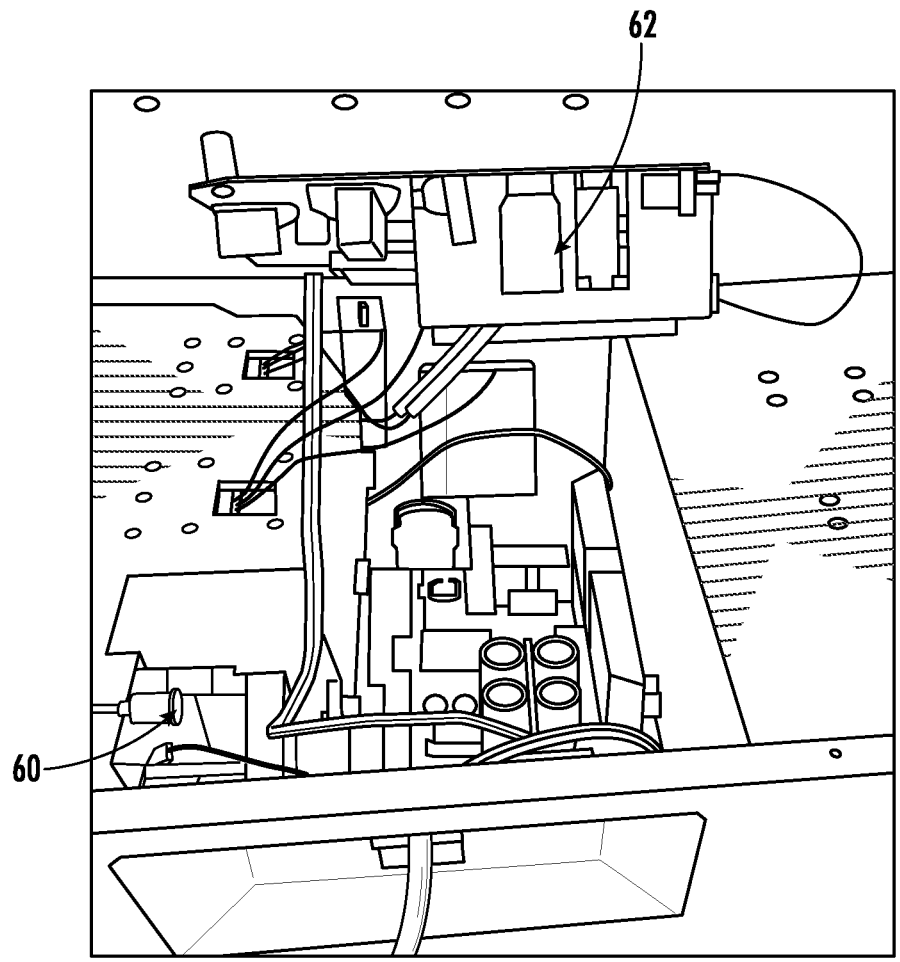
FIG. 6 is a detailed perspective view of the storage device of FIG. 1, according to an exemplary embodiment.
Figure 7:
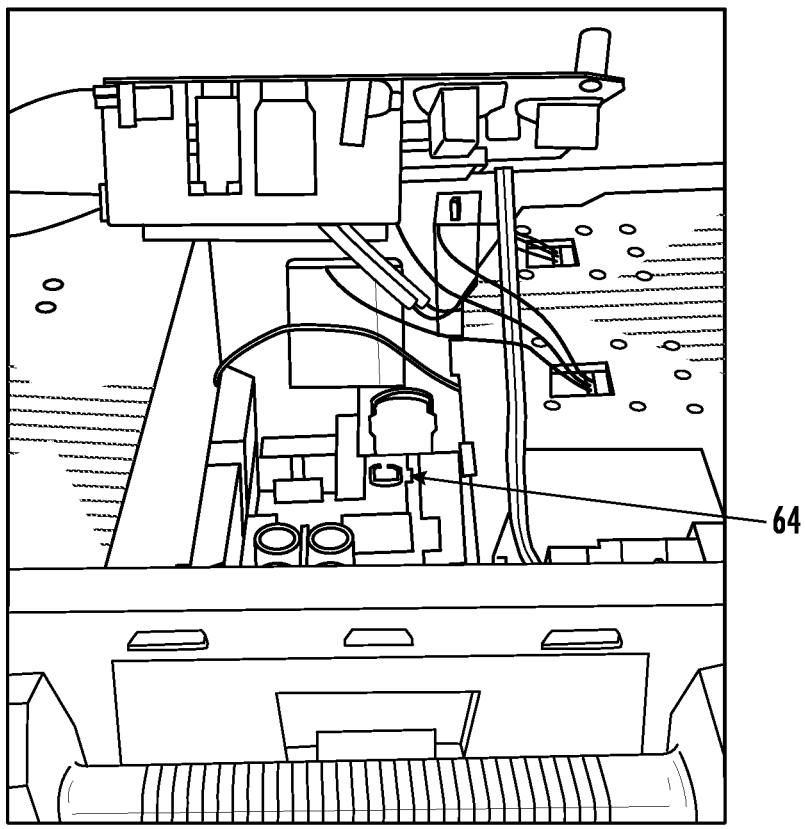
FIG. 7 is a detailed perspective view of the storage device of FIG. 1, according to an exemplary embodiment.
Figure 8:
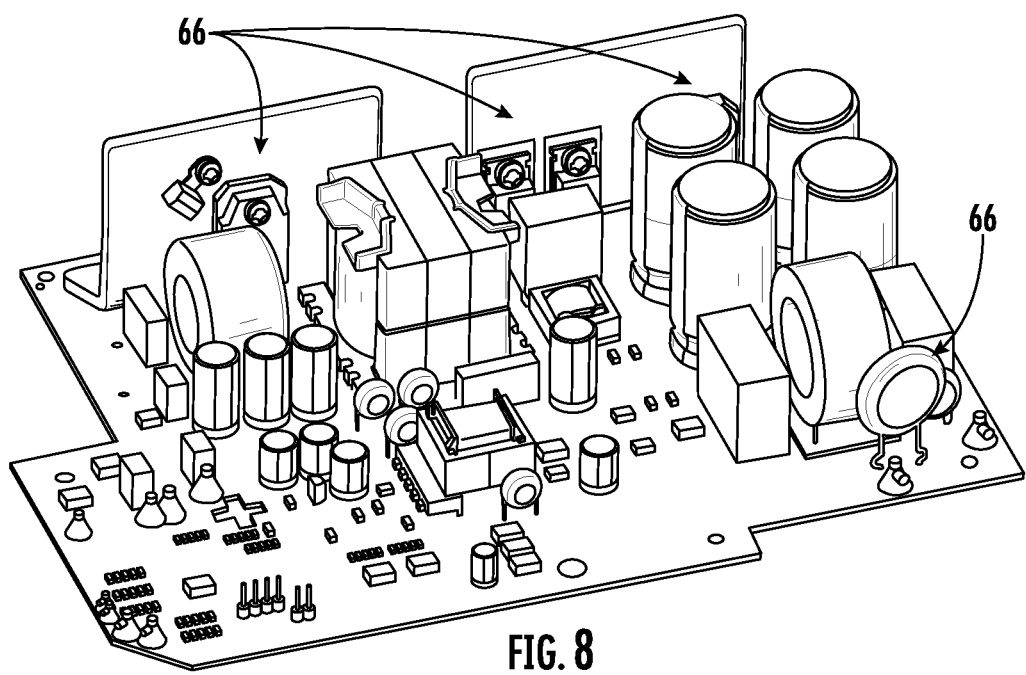
FIG. 8 is a perspective view of a component of the storage device of FIG. 1, according to an exemplary embodiment.

Turning to FIGS. 6-12, various electronic aspects of storage device 10 are shown. Storage device 10 includes USB board 60 and a dual bay PCBA 62 (FIG. 6). Storage device 10 includes supercharger 64 (FIG. 7). Electronics 60, 62 and 64 collectively provide storage device 10 the ability to charge one or more of first battery 80, second batteries 82, and two USB outlets 46, such as a USB-A port and a USB-C port. A plurality of superchargers 66, shown as four superchargers 66 in FIG. 8, enable storage device 10 to quickly charge multiple batteries and/or devices simultaneously.

Figure 9:
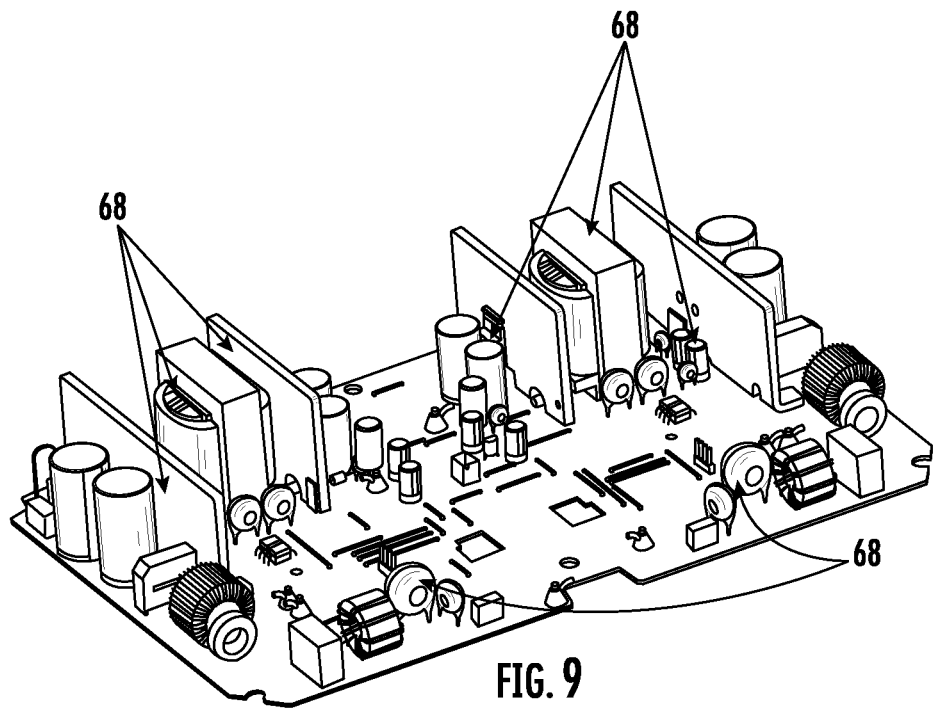
FIG. 9 is a perspective view of a component of the storage device of FIG. 1, according to an exemplary embodiment.

Storage device 10 includes one or more dual bay thermocouple locations 68 (FIG. 9). In a specific embodiment storage device 10 includes seven thermocouple locations 68.

Figure 10:
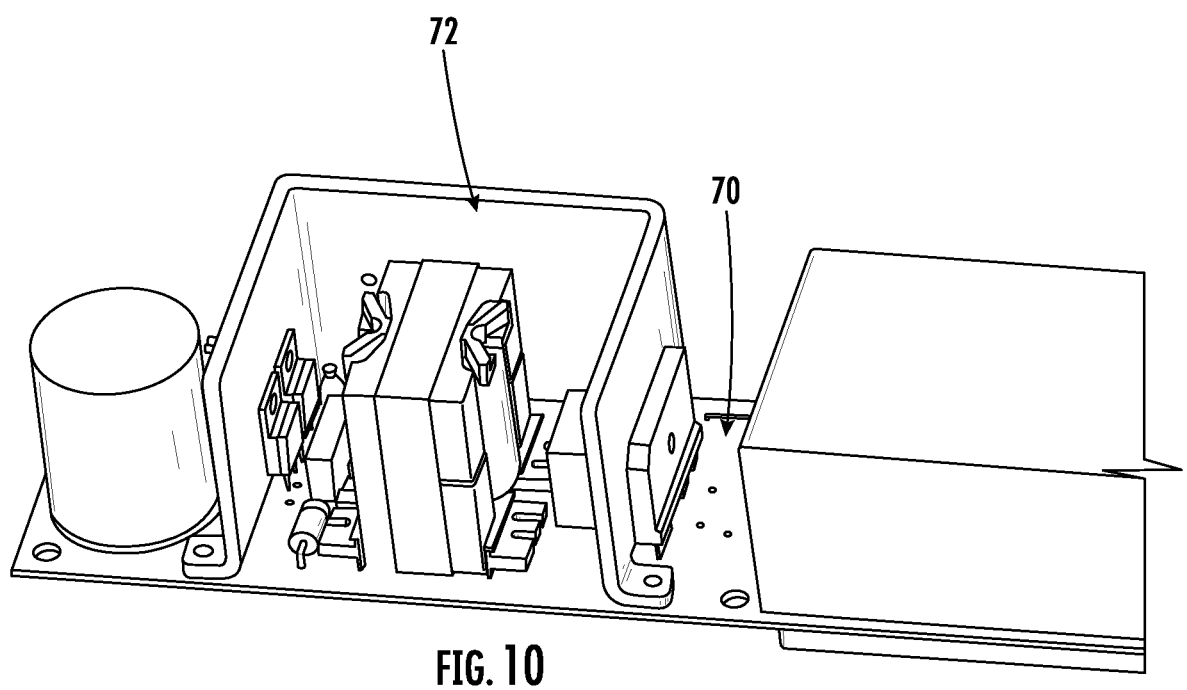
FIG. 10 is a perspective view of a component of the storage device of FIG. 1, according to an exemplary embodiment.
Figure 11:
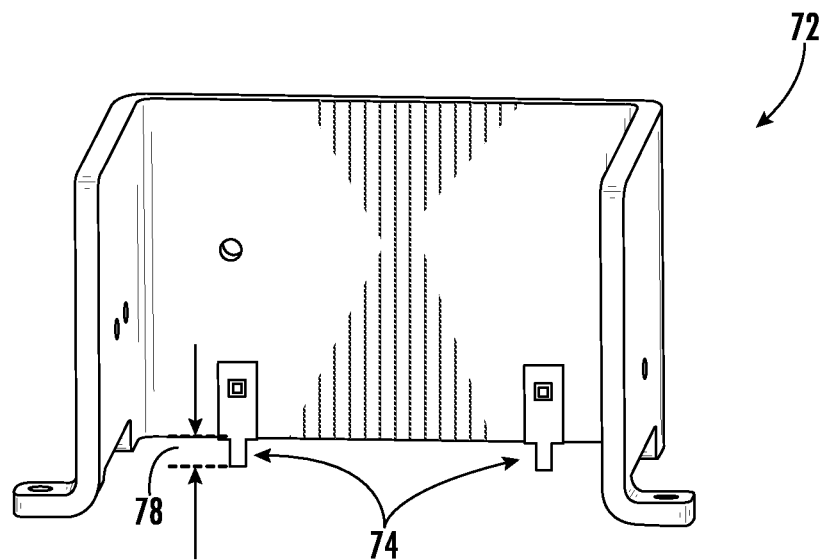
FIG. 11 is a perspective view of a component of the storage device of FIG. 1, according to an exemplary embodiment.
Figure 12:
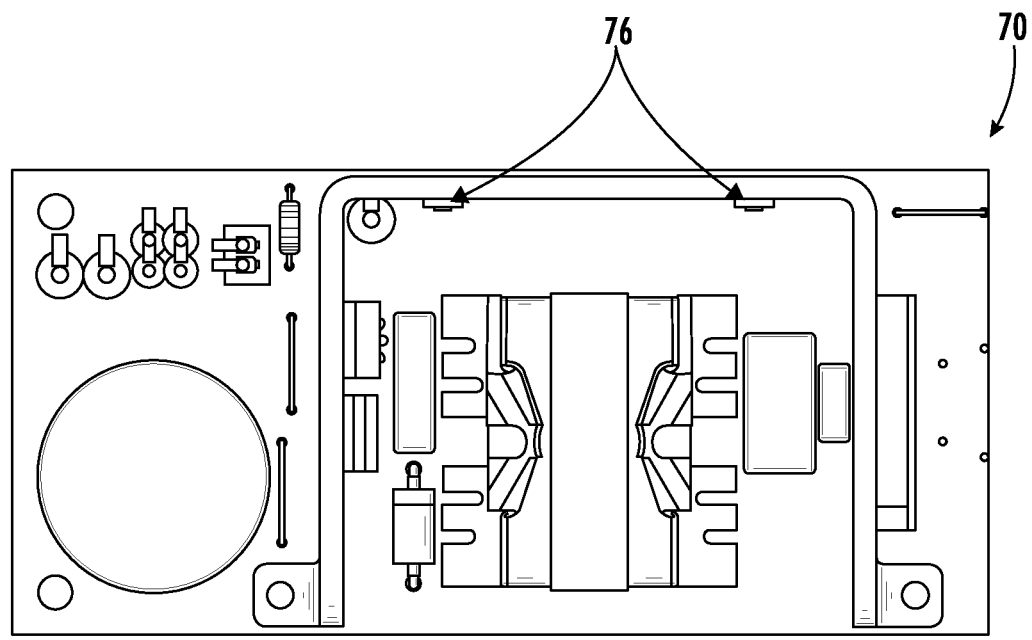
FIG. 12 is a top view of a component of the storage device of FIG. 1, according to an exemplary embodiment.

Turning to FIGS. 10-12, storage device 10 includes a heat sink 72 with an innovative solder structure, shown as solder stakes 74. Solder stakes 74 extend distance 78 from a bottom of heat sink 72. Recesses 76 in circuit board 70 receive solder stakes 74. Solder stakes 74 protruding into circuit board 70 provides improved thermal transmission and an improved structural stability compared to a non-intrusive interface between heat sink 72 and circuit board 70. In a specific embodiment, the item labeled 1.6 W is a boost diode, the item labeled 2 W is a transformer, the item labeled 5.49 W is a bridge diode, and the item labeled 9.82 W is a PFC Mosfet. Sample measurements of the thermal properties of these devices are depicted in Tables 1, 2 and 3, shown below.

| PFC Mosfet | | | Bridge Diode | | | Boost Diode | | |
|---|---|---|---|---|---|---|---|---|
| Case temperature | 132.913 | °C. | Case temperature | 142.314 | °C. | Case temperature | 168.92 | °C. |
| Power dissipated | 9.82 | Watts | Power dissipated | 5.49 | Watts | Power dissipated | 1.6 | Watts |
| Device $R_{\theta(J-c)}$ | 1.74 | °C./W | Device $R_{\theta(J-c)}$ | 1.4 | °C./W | Device $R_{\theta(J-c)}$ | 3.8 | °C./W |
| Device junction temp | 149.9998 | °C. | Device junction temp | 150 | °C. | Device junction temp | 175 | °C. |
| Table 1 | | | Table 2 | | | Table 3 | | |

Figure 13:
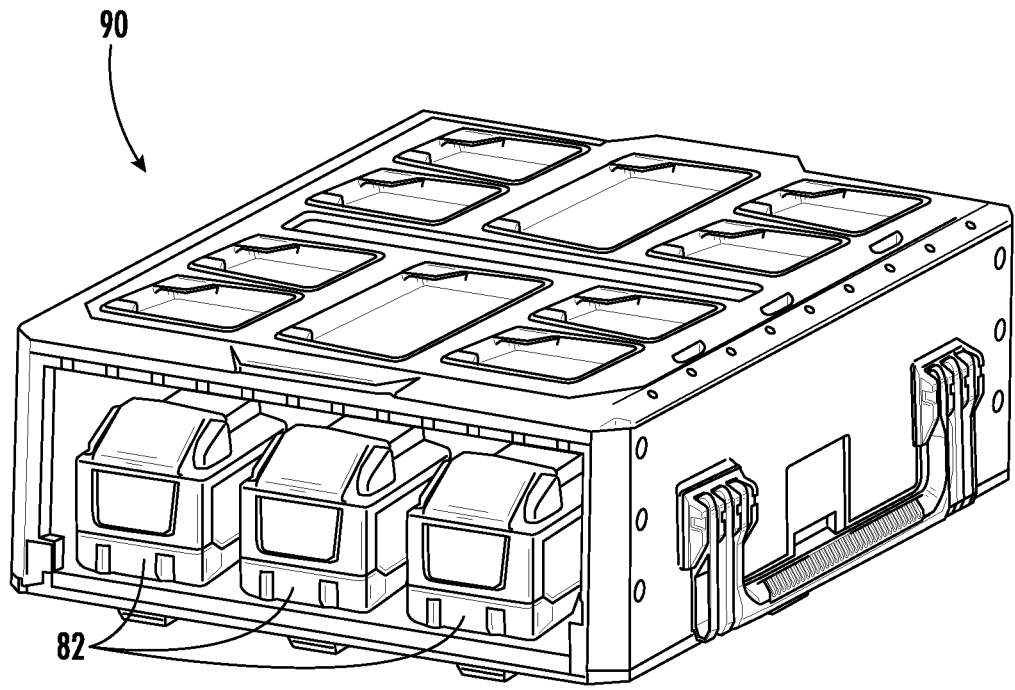
FIG. 13 is a perspective view of a storage device, according to an exemplary embodiment.

Turning to FIG. 13, various aspects of storage device 90 are shown. Storage device 90 is functionally similar to storage device 10, except for the differences described herein. Storage device 90 receives three of a single type of battery, shown as rechargeable power tool battery 80.

Figure 14:
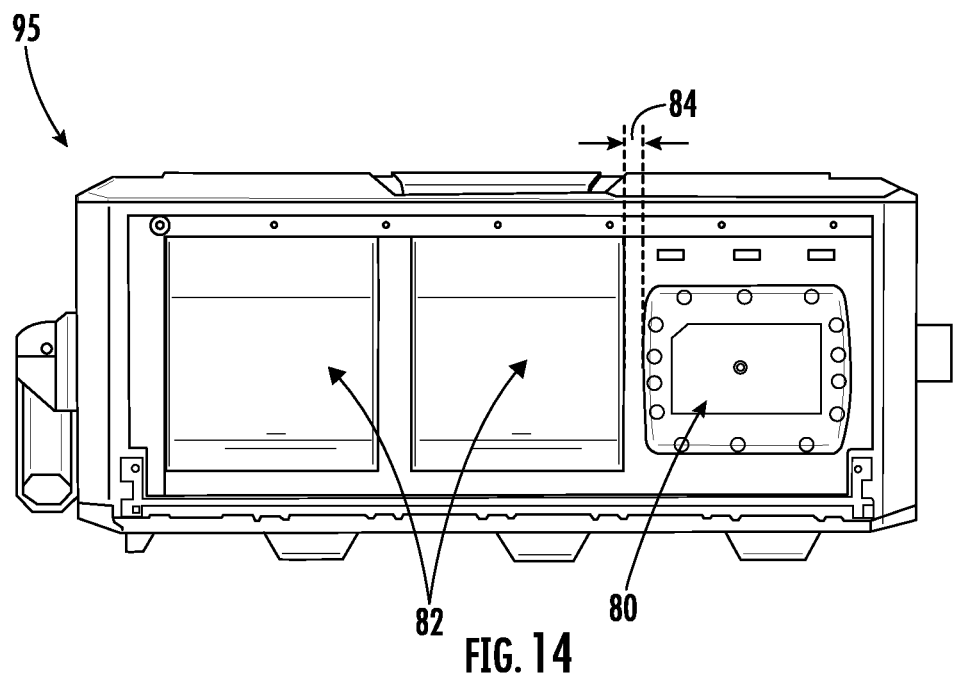
FIG. 14 is a perspective view of a storage device, according to an exemplary embodiment.
Figure 15:
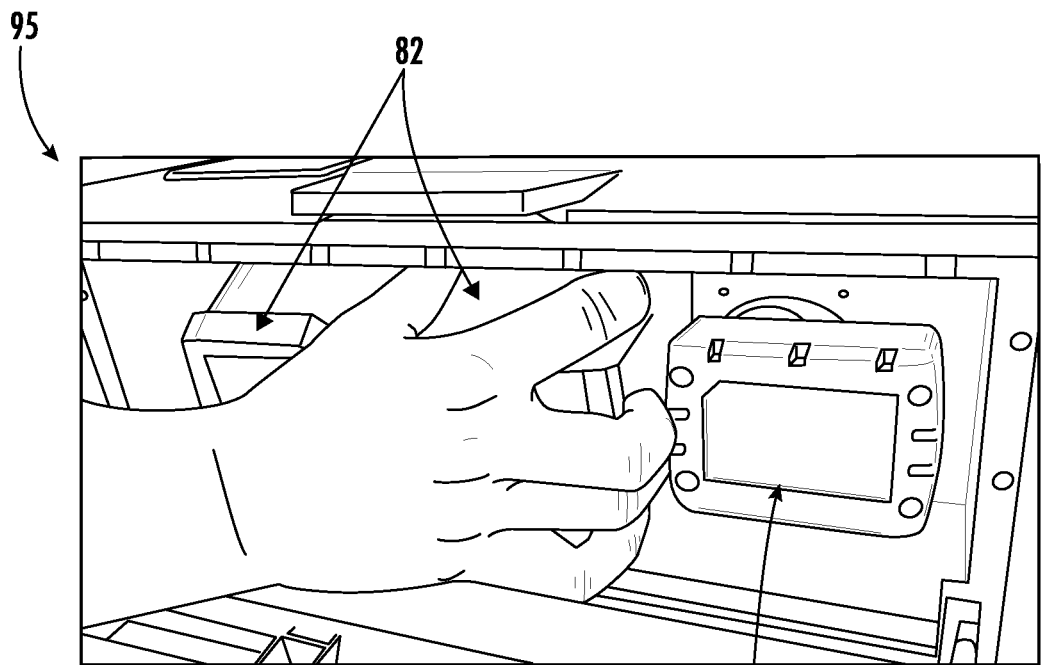
FIG. 15 is a detailed perspective view of the storage device of FIG. 14, according to an exemplary embodiment.
Figure 16:
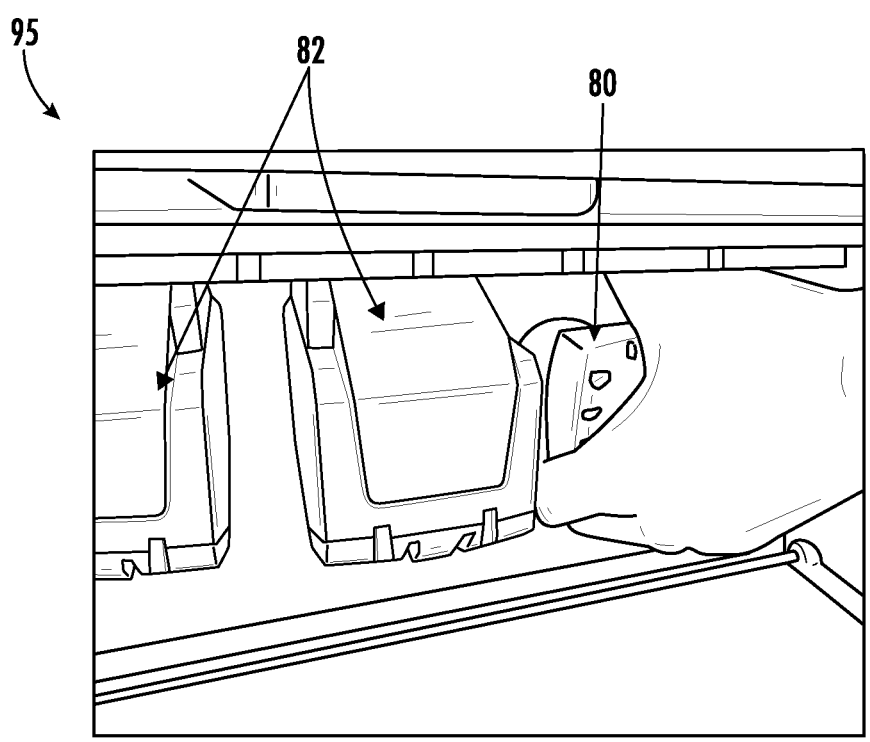
FIG. 16 is a detailed perspective view of the storage device of FIG. 14, according to an exemplary embodiment.
Figure 17:
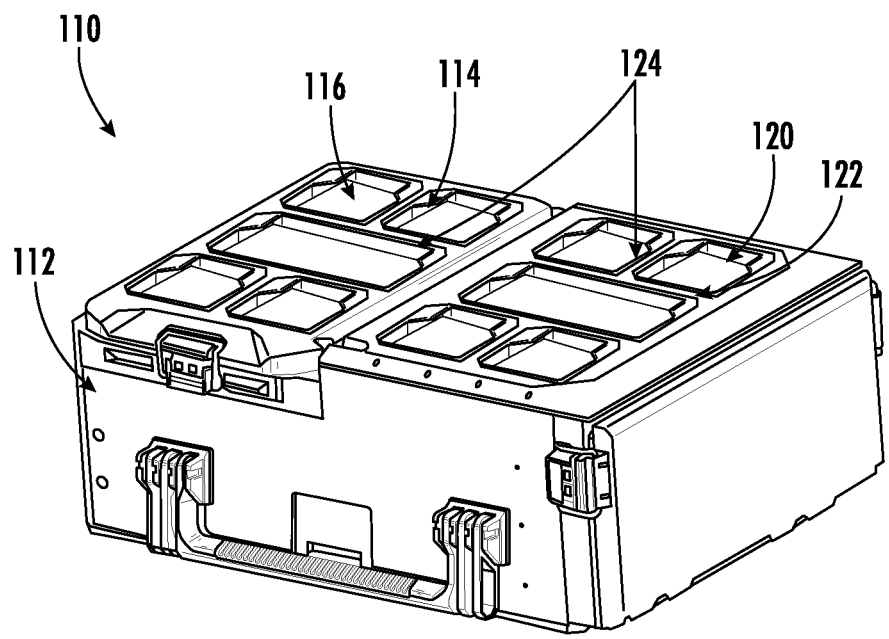
FIG. 17 is a perspective view of a storage device, according to an exemplary embodiment.
Figure 18:
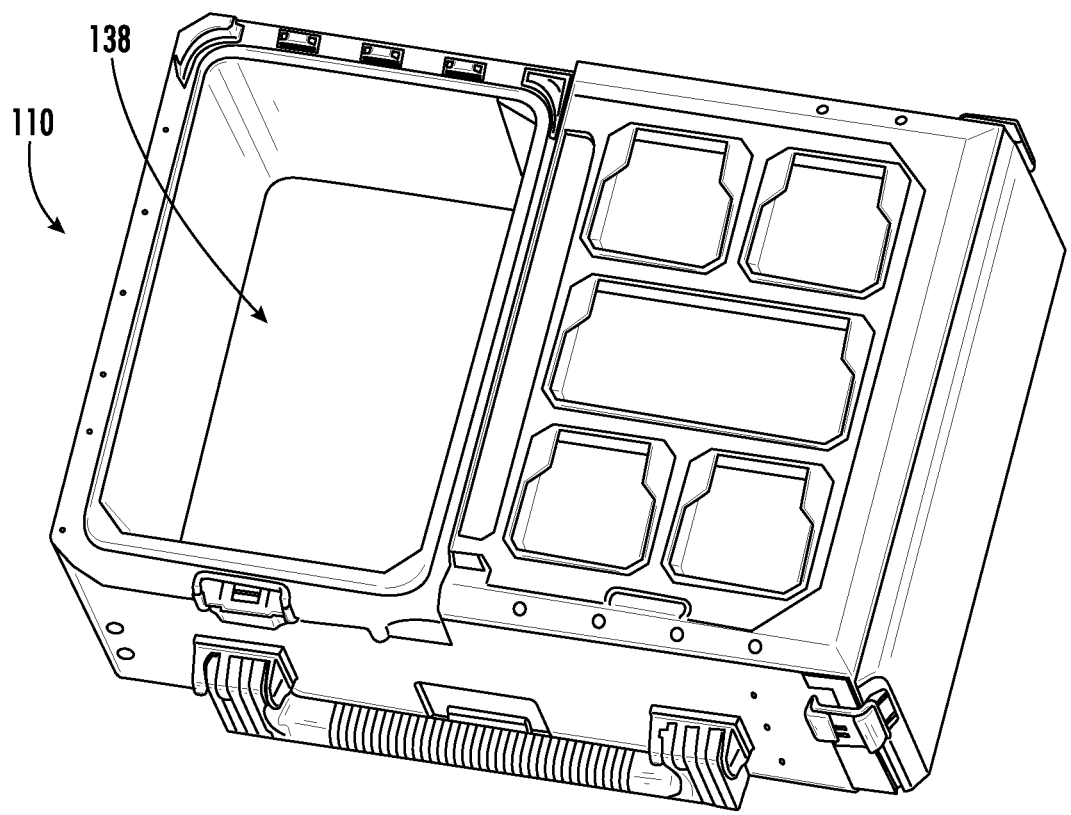
FIG. 18 is a perspective view of the storage device of FIG. 17, according to an exemplary embodiment.
Figure 19:
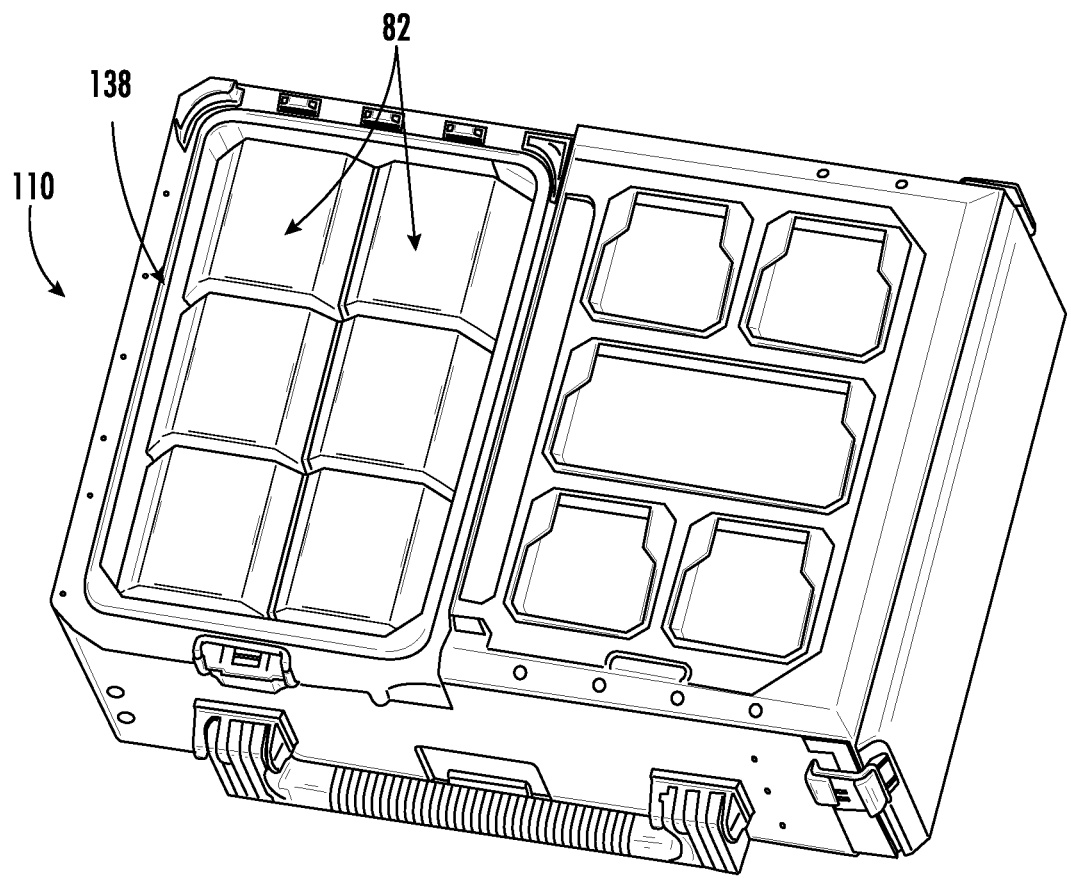
FIG. 19 is a perspective view of the storage device of FIG. 17, according to an exemplary embodiment.
Figure 20:
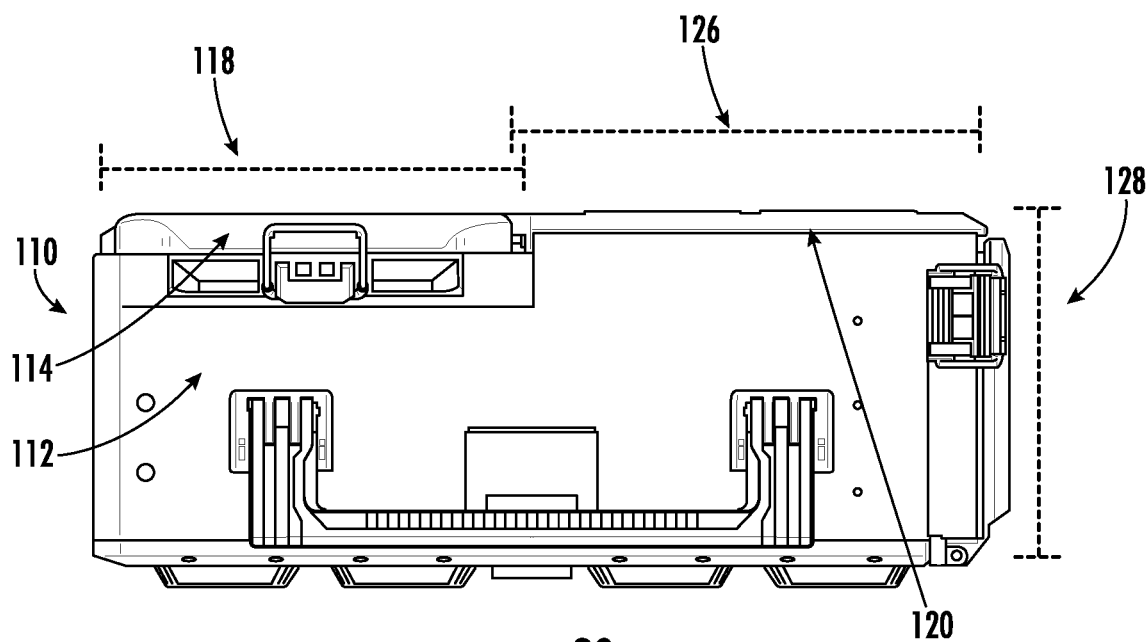
FIG. 20 is a front view of the storage device of FIG. 17, according to an exemplary embodiment.
Figure 21:
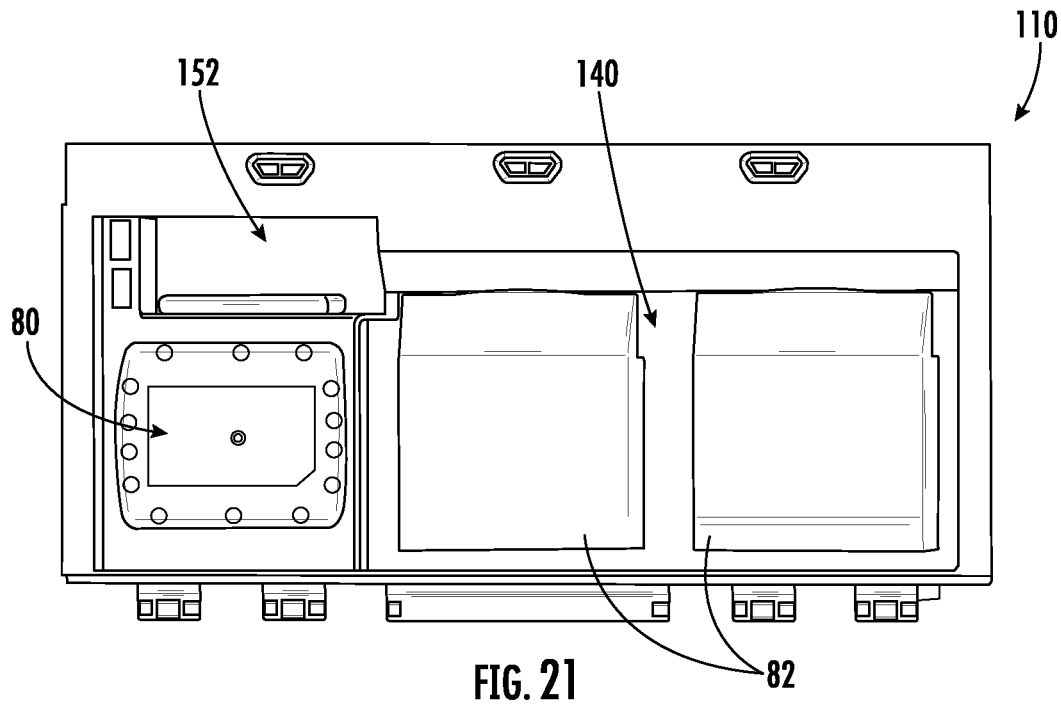
FIG. 21 is a side schematic view of the storage device of FIG. 17, according to an exemplary embodiment.
Figure 22:
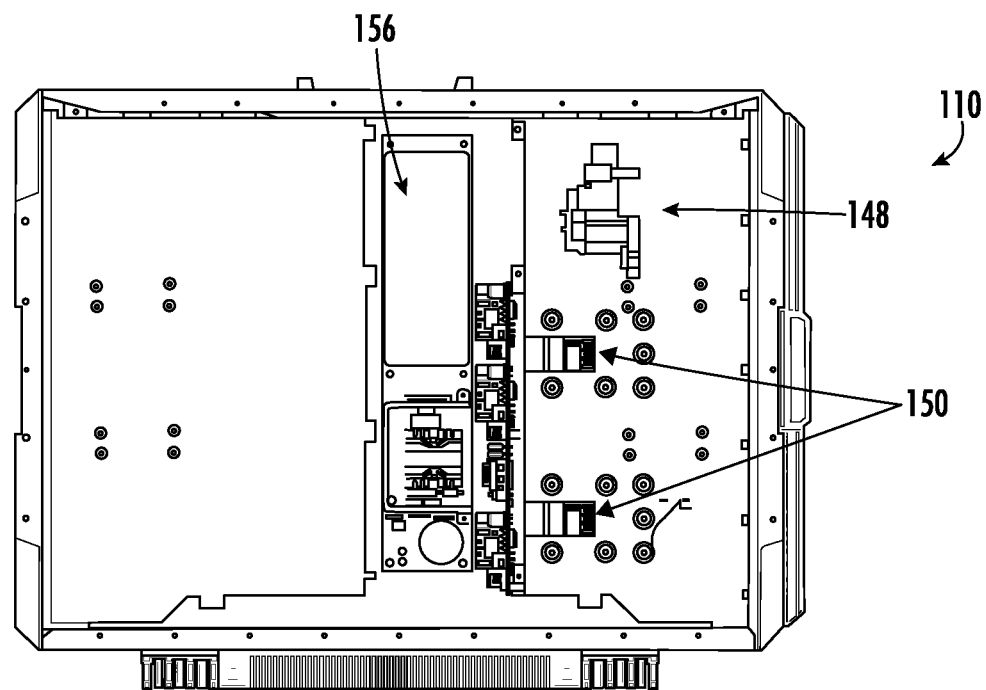
FIG. 22 is a top schematic view of the storage device of FIG. 17, according to an exemplary embodiment.
Figure 23:
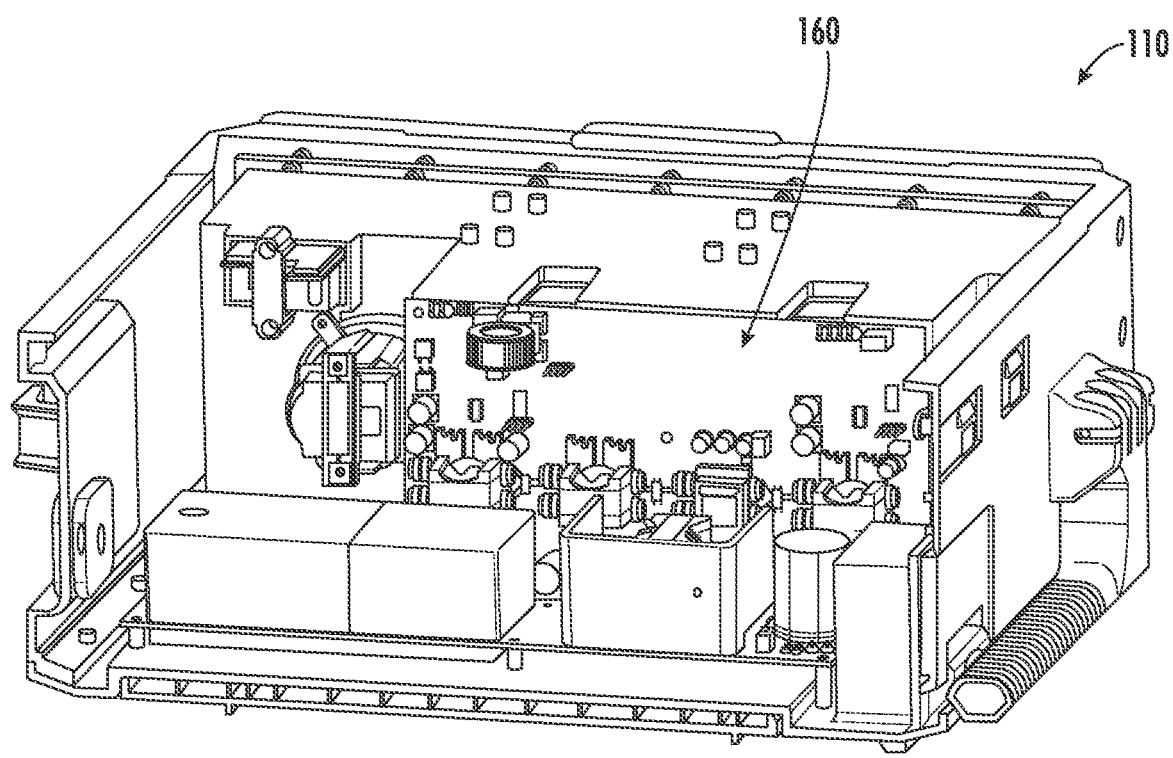
FIG. 23 is a cross-section perspective view of the storage device of FIG. 17, according to an exemplary embodiment.

Turning to FIGS. 14-16, various aspects of storage device 95 are shown. Storage device 95 is functionally similar to storage device 10 and storage device 90, except for the differences described herein. Storage device 95 receives one battery 80 on the right-side, and two batteries 82 in the center and left-side (as seen in FIG. 15). In a specific embodiment battery 80 is spaced more than 36 mm from battery 82 in the central location, and more specifically is more than 45 mm, and more specifically is 48.47 mm.

Turning to FIGS. 17-23, various aspects of storage device 110 are shown. Storage device 110 is functionally similar to storage device 10, storage device 90 and storage device 95 except for the differences described herein. When first top panel 114 is removed, storage compartment 138 is exposed. Storage compartment 138 is sized to receive a plurality of batteries 80 and/or batteries 82, such as six batteries 82.

Storage device 110 includes first top panel 114 and second top panel 120, which collectively are coupled to a top of housing 112. First top panel 114 includes first top surface 116 and has width 118. Second top panel 120 includes second top surface 122 and has width 126. First top panel 114 and second top panel 120 each include coupling components 124, which enable storage device 110 to be coupled to other objects, devices, containers, and/or units. Housing 112 has height 128.

Charging bay 140 receives two batteries 82 to be recharged by battery charger 150, and one battery 80 to be recharged by battery charger 148. Storage compartment 152 stores objects, such as personal electronic devices like cellular phones.

Storage device 110 includes PFC PCBA 156 board, to which battery chargers 148 and 150 are electrically coupled. Storage device 110 also includes DCDC PCBA board 160. PFC PCBA board 156 and DCDC PCBA board 160 collectively enable electrical and/or power communications within storage device 110.

Figure 24:
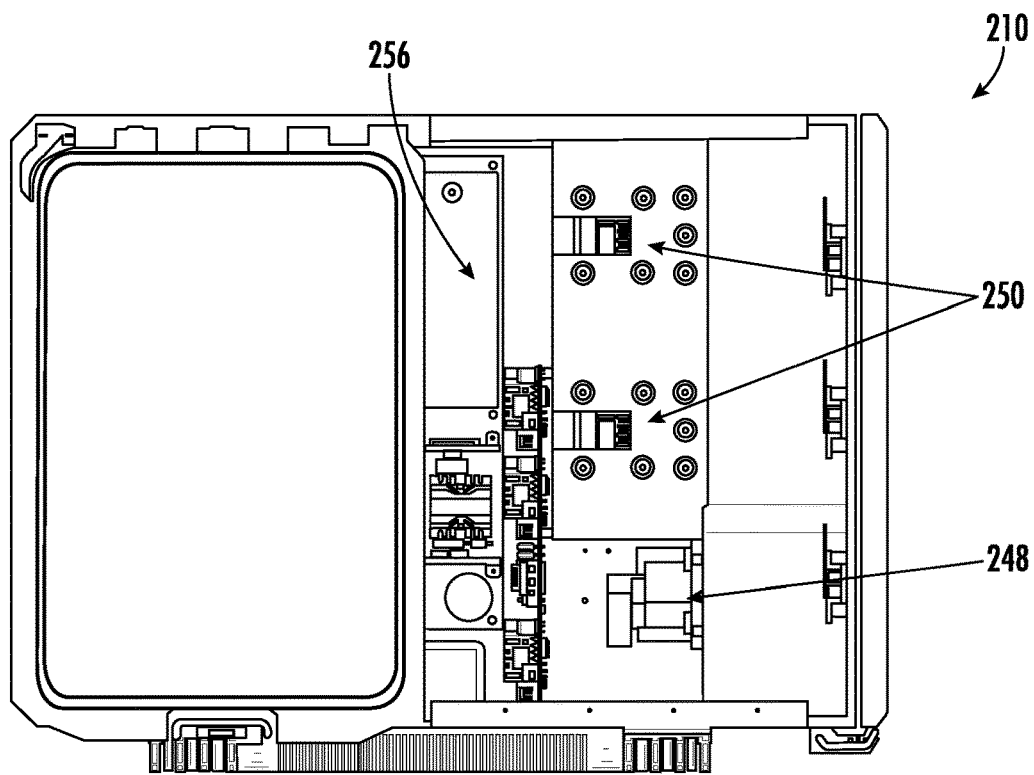
FIG. 24 is a top view of a storage device, according to an exemplary embodiment.
Figure 25:
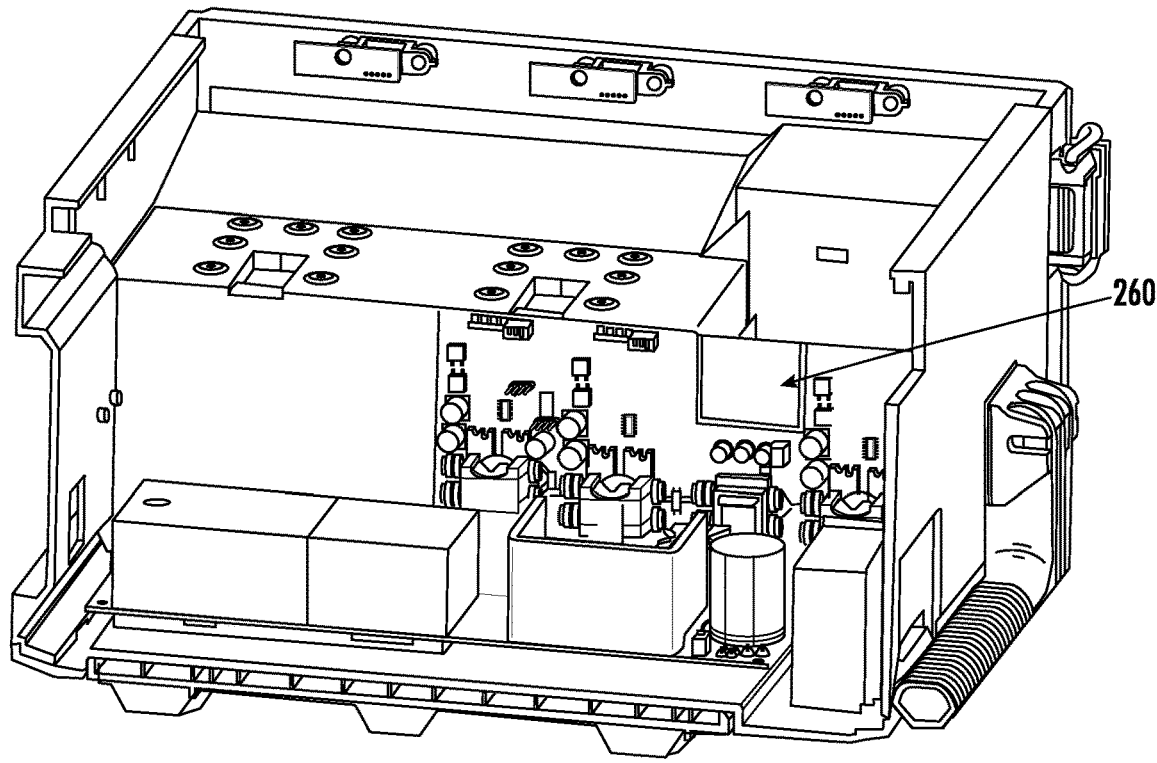
FIG. 25 is a cross-section perspective view of the storage device of FIG. 24, according to an exemplary embodiment.

Turning to FIGS. 24-25, various aspects of storage device 210 are shown. Storage device 210 is functionally similar to storage device 10, storage device 90, storage device 95 and storage device 110 except for the differences described herein. Storage device 210 includes a redesigned PFC PCBA board 256 and a redesigned DCDC PCBA board 260, compared to storage device 110. PFC PCBA board 256 and DCDC PCBA board 260 are electrically coupled to battery chargers 248 and 250.

Figure 26:
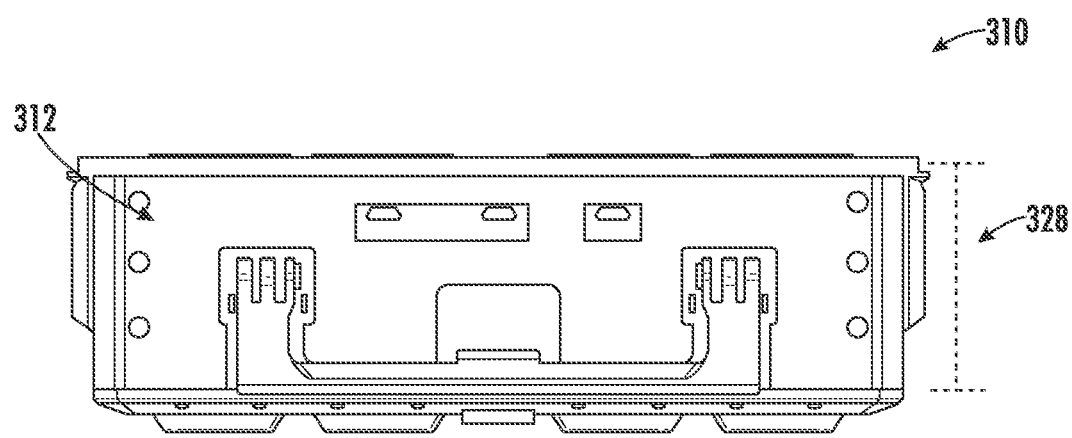
FIG. 26 is a front view of a storage device, according to an exemplary embodiment.
Figure 27:
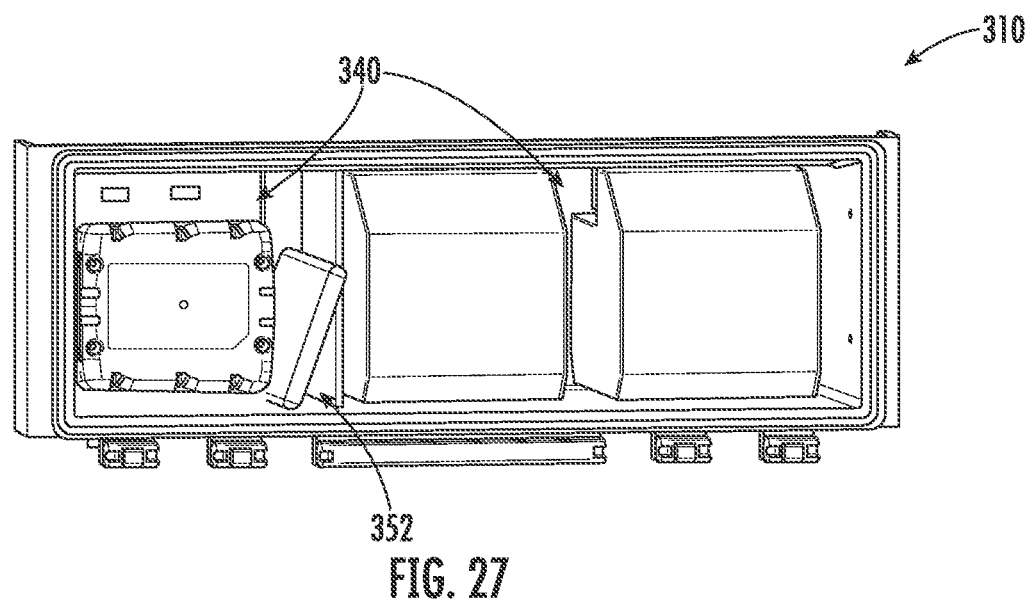
FIG. 27 is a side view of the storage device of FIG. 26, according to an exemplary embodiment.

Turning to FIGS. 26-27, various aspects of storage device 310 are shown. Storage device 310 is functionally similar to storage device 10, storage device 90, storage device 95, storage device 110 and storage device 210 except for the differences described herein. Housing 312 includes height 328, which is shorter than height 128 of housing 112 of storage device 110. In a specific embodiment height 328 is between 2.5 inches and 1.5 inches less than height 128, and more specifically height 328 is 2 inches less than height 128. Storage compartment 352 is laterally adjacent to batteries within charging bay 340, unlike in storage device 110 in which storage compartment 138 is above at least one of the batteries being recharged.

Figure 28:
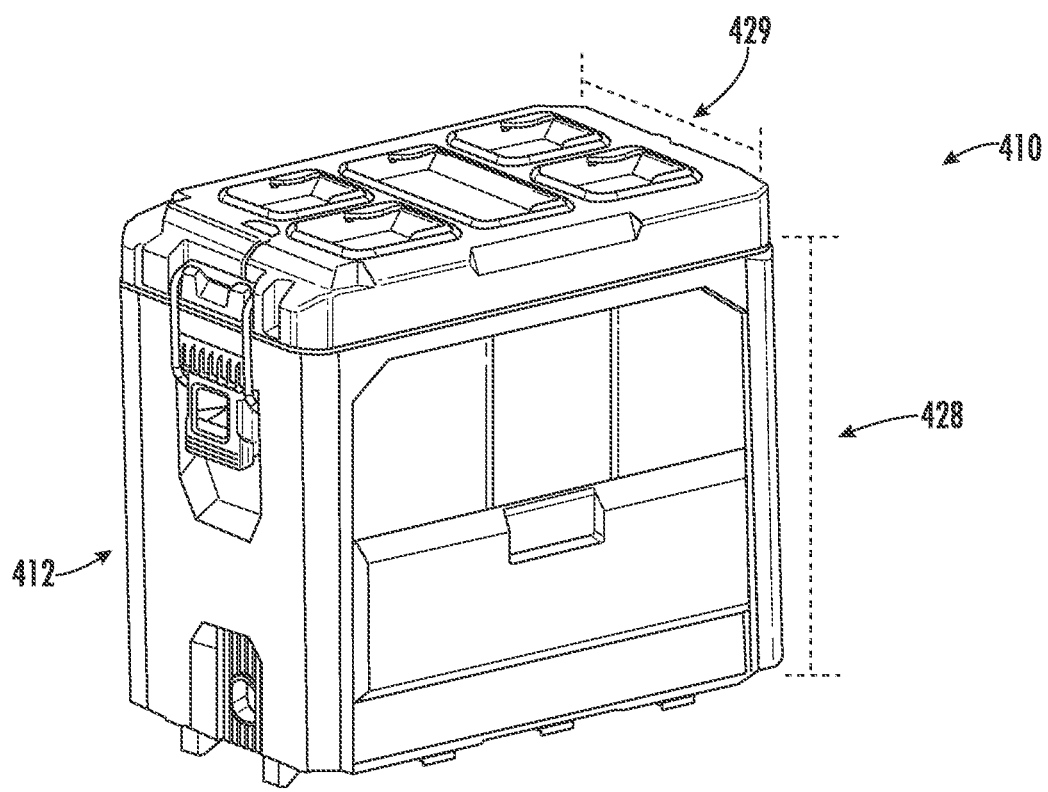
FIG. 28 is a perspective view of a storage device, according to an exemplary embodiment.
Figure 29:
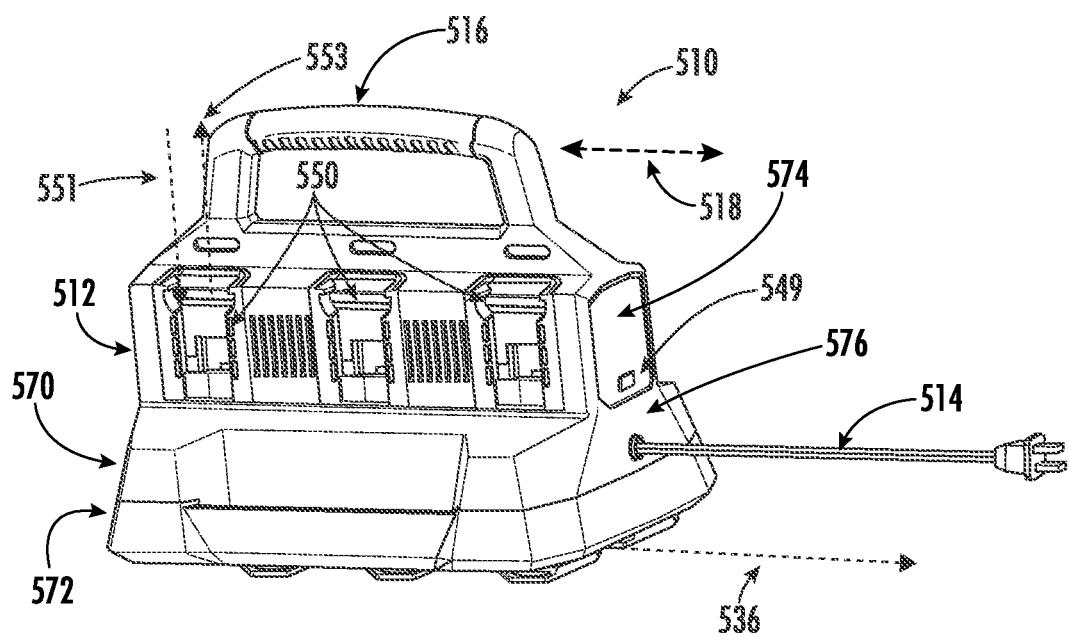
FIG. 29 is a perspective view of a power distribution device, according to an exemplary embodiment.
Figure 30:
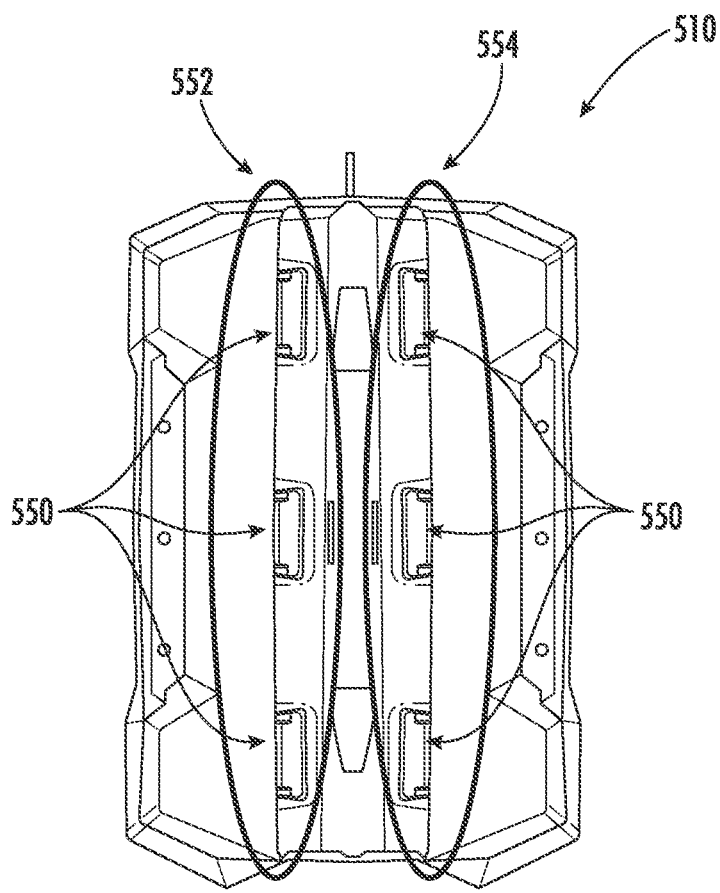
FIG. 30 is a top view of the power distribution device of FIG. 29, according to an exemplary embodiment.
Figure 31:
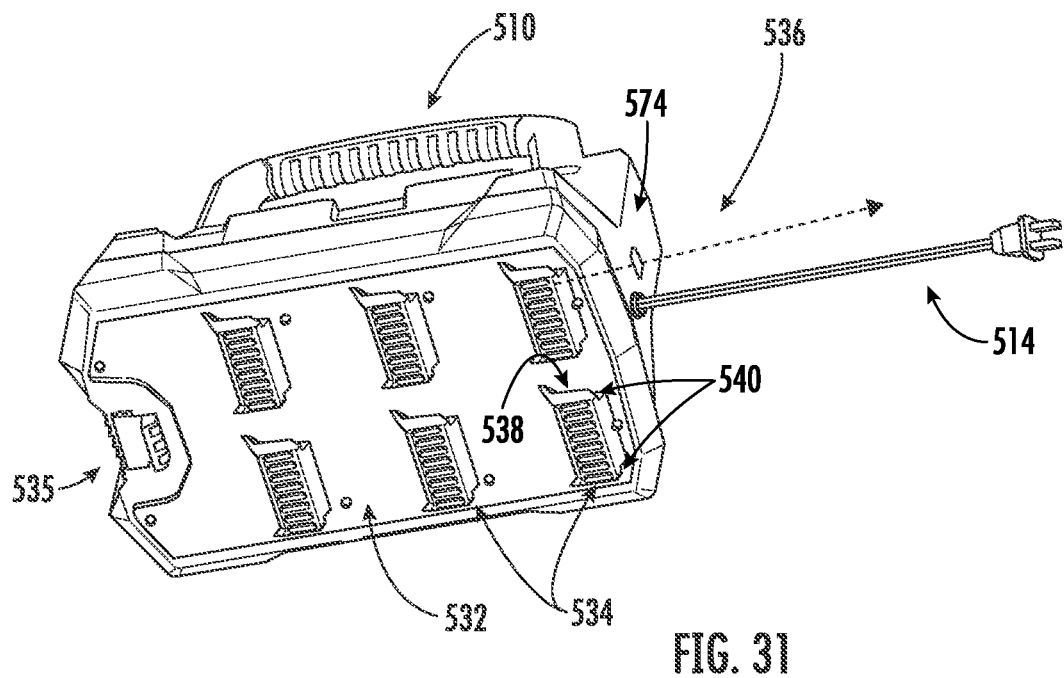
FIG. 31 is a perspective view from below of the power distribution device of FIG. 29, according to an exemplary embodiment.
Figure 32:
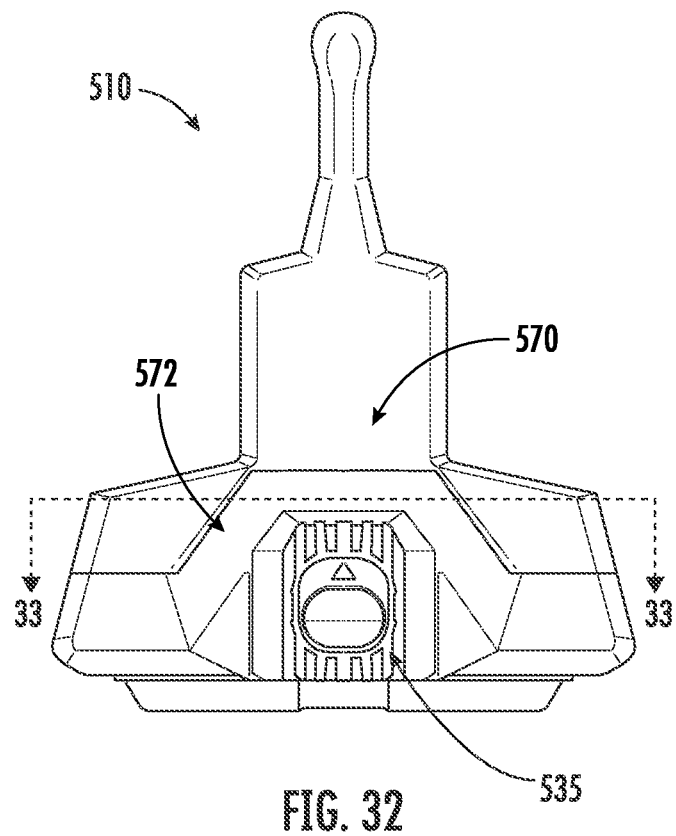
FIG. 32 is a rear view of the power distribution device of FIG. 29, according to an exemplary embodiment.
Figure 33:
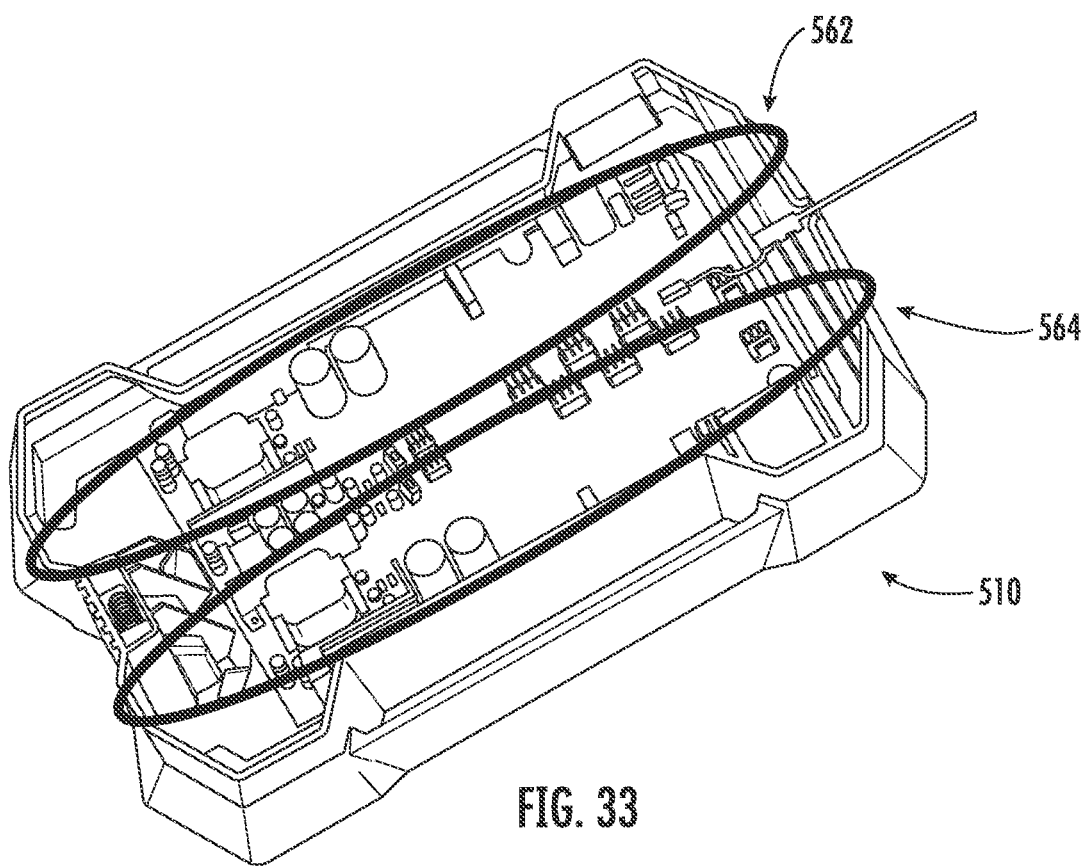
FIG. 33 is a cross-section view of the power distribution device of FIG. 29 taken along line 33-33 in FIG. 32, according to an exemplary embodiment.

Turning to FIG. 28, various aspects of storage device 410 are shown. Storage device 410 is functionally similar to storage device 10, storage device 90, storage device 95, storage device 110, storage device 210, and storage device 310 except for the differences described herein. Housing 412 defines width 429. In a specific embodiment, width 429 of storage device 410 is approximately half of width 29 of storage device 10. As a result, two storage devices 410 can be simultaneously be coupled to top panel 14 of storage device 10.

Turning to FIGS. 29-33, various aspects of a device, unit and/or container for distributing power, shown as charging device 510, are shown. Charging device 510 is substantially the same as storage device 10, storage device 90, storage device 95, storage device 110, storage device 210, storage device 310, or storage device 410 except for the differences described herein.

Charging device 510 includes a housing 512 and a device to receive power, shown as power input 514, extending from the housing 512, the power input 514 configured to receive power, such as electricity (e.g., alternating current electricity). In various embodiments, power input 514 extends from front side 574 of housing 512, the front side 574 defining front surface 576 that faces in first direction 536. Charging device 510 includes a device to distribute power, shown as USB outlet 549. In various embodiments, USB outlet 549 is coupled to front side 574 of housing 512. In various embodiments, USB outlet 549 is located on front side 574 opposite the rear side 570 where latch 535 is coupled. Charging device 510 includes one or more power tool battery interfaces 550 each configured to physically couple to a rechargeable power tool battery and to receive power from the power input 514. In a specific embodiment, charging device 510 includes a plurality of power tool battery interfaces 550, including a first power tool battery interface 550. For example, the charging device 510 includes a first subset 552 of three power tool battery interfaces 550 and a second subset 554 of three power tool battery interfaces 550 distinct from the first subset 552. First subset 552 of power tool battery interfaces 550 is disposed on one side of charging device 510, and second subset 554 of power tool battery interfaces 550 is on an opposing side of charging device 510. In various embodiments, first subset 552 receives power from power input 514 in parallel with second subset 554, power tool battery interfaces 550 within first subset 552 receive power in series with each other, and/or power tool battery interfaces 550 within second subset 554 receive power in series with each other.

Charging device 510 includes a bottom surface 532 defined by housing 512, and plurality of coupling components 534 extend from bottom surface 532 of charging device 510. Coupling components 534 define a coupling direction, illustrated by first direction 536, such that sliding charging device 510 in the direction of first direction 536 causes coupling components 534 to engage with a modular unit, such as corresponding coupling recesses in the modular unit. Charging device 510 includes latch 535 to couple charging device 510 to modular units, such as modular tool storage units. Latch 535 is slideably coupled to housing 512, the latch 535 actuating between a locked position and an unlocked position. The latch 535 restricts the plurality of coupling components 534 from slideably disengaging from the modular unit when the latch 535 is positioned in the locked position (e.g., via the latch 535 protruding into a recess in the modular unit, thereby restricting movement between the charging device 510 and the modular unit). In various embodiments, latch 535 is coupled to a rear side 570 of housing 512, the rear side 570 defining a rear surface 572 that faces away from first direction 536. In various embodiments, the plurality of coupling components 534 include a front row of at least two coupling components 534 aligned with each other in a direction parallel to a front surface 576 of the charging device 510 and a rear row of at least two coupling components 534 aligned with each other in the direction parallel to the front surface 576 of the charging device 510.

In a specific embodiment, charging device 510 does not include a storage compartment. In various embodiments, each of coupling components 534 include a ledge 540 defining an upper surface 538 that faces upward towards the bottom surface 532.

Charging device 510 includes a handle 516 extending from housing 512, such as upward, away from the plurality of coupling components 534. Handle 516 extends along a longitudinal axis 518 generally parallel to first direction 536 along which charging device 510 slides to slideably engage coupling components 534 with a utility module.

Each of the power tool battery interfaces 550 defines a battery mounting direction 551 and battery removing direction 553 through which a battery is moved to mount/remove from power tool battery interface 550. In various embodiments, power tool battery interfaces 550 define a battery mounting direction 551 along which a rechargeable power tool battery slides with respect to the power tool battery interface 550 when the rechargeable power tool battery is being mounted. In a specific embodiment, the battery mounting direction 551 and the battery removing direction 553 are substantially vertical, and more specifically are vertical. In general, power tool battery interfaces 550 are configured such that the battery mounting/removing directions 551, 553 are not aligned with first direction 536 of coupling components 534 and specifically is substantially perpendicular to first direction 536 of coupling components 534. In the specific embodiment shown, the first direction 536 of coupling components 534 is substantially horizontal and the battery removing/mounting directions 551, 553 of power tool battery interfaces 550 are vertical, and therefore battery mounting direction 551 is generally perpendicular to first direction 536. In such embodiments, the relative orientation of power tool battery interfaces 550 and coupling components 534 allows for mounting and removal of batteries without causing disengagement of coupling components 534 as may be the case with some horizontally oriented power tool battery interfaces 550.

In a specific embodiment, charging device 510 includes a first electronic board 562 and second electronic board 564 providing power to power tool battery interfaces 550. First electronic board 562 and second electronic board 564 are generally identified in FIG. 33. First electronic board 562 controls and provides power to first subset 552 of power tool battery interfaces 550, and second electronic board 564 controls and provides power to second subset 554 of power tool battery interfaces 550. In a specific embodiment, first electronic board 562 provides power to power tool battery interfaces 550 in series (e.g., sequentially), such that most and/or all of the power being provided from first electronic board 562 is sent to a single power tool battery interfaces 550 in first subset 552. When the battery coupled to the power tool battery interface 550 in first subset 552 receiving most/all of the power is fully and/or mostly charged, first electronic board 562 redirects power to another power tool battery interface 550 in first subset 552. In a specific embodiment, second electronic board 564 and second subset 554 of power tool battery interfaces 550 similarly charges batteries in series.

In a specific embodiment, first electronic board 562 and second electronic board 564 distribute power to power tool battery interfaces 550 in parallel with each other. In this embodiment, up to two power tool battery interfaces 550 may be receiving power to recharge their respective batteries at a given time, one from each set.

Figure 34:
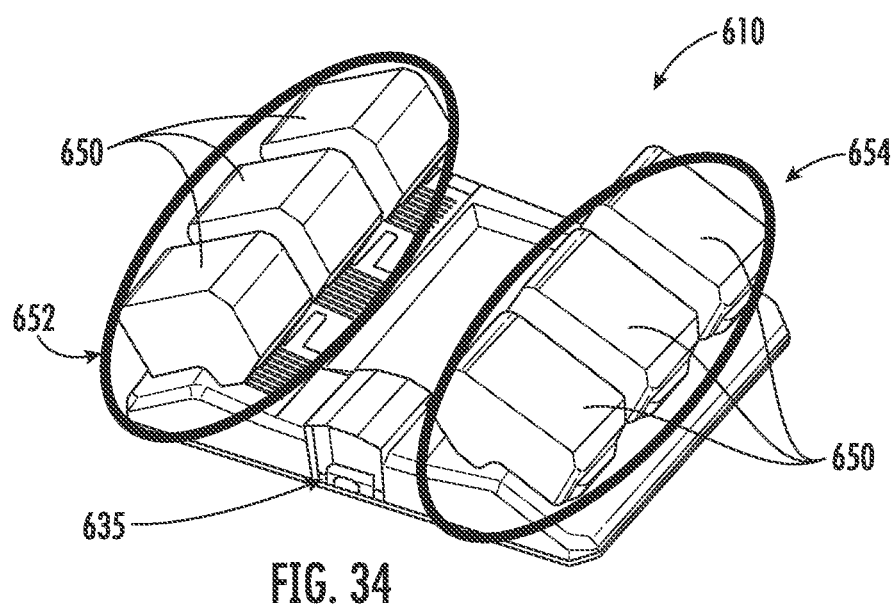
FIG. 34 is a perspective view of a power distribution device, according to an exemplary embodiment.

Turning to FIG. 34, various aspects of a device, unit and/or container for distributing power, shown as charging device 610, are shown. Charging device 610 is functionally similar to charging device 510 except for the differences described herein. Charging device 610 is also functionally similar to storage device 10, storage device 90, storage device 95, storage device 110, storage device 210, storage device 310, and storage device 410 except for the differences described herein.

Charging device 610 includes latch 635 to couple charging device 610 to modular units, such as modular tool storage units. In a specific embodiment, charging device 610 includes coupling components on a bottom surface of charging device 610 to couple charging device 610 to modular units, such as modular tool storage units.

Charging device 610 includes one or more battery chargers 650. In a specific embodiment, charging device 610 includes two sets of three battery chargers 650. First set 652 of battery chargers 650 is disposed on one side of charging device 610, and second set 654 of battery chargers 650 is on an opposing side of charging device 610.

In a specific embodiment, first set 652 charges batteries in series and second set 654 similarly charges batteries in series. In a specific embodiment, batteries coupled to first set 652 are charged in parallel with batteries coupled to second set 654.

It should be understood that the figures illustrate the exemplary embodiments in detail, and it should be understood that the present application is not limited to the details or methodology set forth in the description or illustrated in the figures. It should also be understood that the terminology is for description purposes only and should not be regarded as limiting.

Further modifications and alternative embodiments of various aspects of the disclosure will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present disclosure.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

What is claimed is:

1. A charging device comprising:
a housing;
a power input extending from the housing, the power input configured to receive alternating current electricity;
a bottom surface defined by the housing;
a plurality of coupling components extending from the bottom surface, each of the plurality of coupling components comprising a ledge defining an upper surface that faces upward towards the bottom surface; and
a plurality of power tool battery interfaces comprising a first power tool battery interface configured to physically couple with a rechargeable power tool battery and to receive power from the power input, the plurality of power tool battery interfaces configured to physically couple with the rechargeable power tool battery and to receive power from the power input, the plurality of power tool battery interfaces comprising a first subset of power tool battery interfaces and a second subset of power tool battery interfaces distinct from the first subset, wherein the first subset receives power in parallel with the second subset, wherein the power tool battery interfaces within the first subset receive power in series with respect to each other, and wherein the power tool battery interfaces within the second subset receive power in series with respect to each other.

2. The charging device of claim 1, the first power tool battery interface defining a battery mounting direction along which the rechargeable power tool battery slides with respect to the first power tool battery interface when the rechargeable power tool battery is being mounted, wherein the battery mounting direction is vertical.

3. The charging device of claim 1, comprising a handle extending from the housing away from the plurality of coupling components.

4. The charging device of claim 1, further comprising:
a first electronic board that provides power to the first subset; and
a second electronic board that provides power to the second subset.

5. A charging device comprising:
a housing;
a power input extending from the housing, the power input configured to receive alternating current electricity;
a bottom surface defined by the housing;
a plurality of coupling components extending from the bottom surface, the plurality of coupling components configured to slideably engage with a modular unit, each of the plurality of coupling components comprising a ledge defining an upper surface that faces upward towards the bottom surface;
a latch slideably coupled to the housing, the latch actuating between a locked position and an unlocked position, wherein the latch restricts the plurality of coupling components from slideably disengaging from the modular unit when the latch is positioned in the locked position; and
a plurality of power tool battery interfaces comprising a first power tool battery interface configured to physically couple with a rechargeable power tool battery and to receive power from the power input, the plurality of power tool battery interfaces configured to physically couple with the rechargeable power tool battery and to receive power from the power input, the plurality of power tool battery interfaces comprising a first subset of power tool battery interfaces and a second subset of power tool battery interfaces distinct from the first subset, wherein the first subset receives power in parallel with the second subset, wherein the power tool battery interfaces within the first subset receive power in series with respect to each other, and wherein the power tool battery interfaces within the second subset receive power in series with respect to each other.

6. The charging device of claim 5, wherein the latch is coupled to a rear side of the housing, the charging device comprising an USB outlet located on a front side of the housing opposite the rear side.

7. The charging device of claim 6, wherein the housing slides in a first direction to slideably engage with the modular unit, wherein the rear side of the housing defines a rear surface facing away from the first direction.

8. The charging device of claim 5, wherein the housing slides in a first direction to slideably engage with the modular unit, wherein the power input extends from a front side of the housing, wherein the front side defines a front surface facing in the first direction.

9. The charging device of claim 5, comprising a handle that extends upward from the housing away from the plurality of coupling components.

10. The charging device of claim 9, wherein the housing slides in a first direction to slideably engage with the modular unit, the handle defining a longitudinal axis that is generally parallel to the first direction.

11. The charging device of claim 5, the power tool battery interface defining a battery mounting direction along which the rechargeable power tool battery slides with respect to the power tool battery interface when the rechargeable power tool battery is being mounted, wherein the battery mounting direction is vertical.

12. The charging device of claim 11, wherein the housing slides in a first direction to slideably engage with the modular unit, wherein the first direction is generally perpendicular to the battery mounting direction.

13. A charging device comprising:
   a housing;
   a power input coupled to the housing;
   a bottom surface defined by the housing;
   a plurality of coupling components extending from the bottom surface, the coupling components configured to slideably engage with a modular unit;
   a latch slideably coupled to the housing, the latch actuating between a locked position and an unlocked position, wherein the latch restricts the plurality of coupling components from slideably disengaging from the modular unit when the latch is positioned in the locked position; and
   a plurality of power tool battery interfaces each configured to physically couple with a rechargeable power tool battery and to receive power from the power input, the plurality of power tool battery interfaces comprising a first subset of power tool battery interfaces and a second subset of power tool battery interfaces distinct from the first subset, wherein the first subset receives power in parallel with the second subset, and wherein the power tool battery interfaces within the first subset receive power in series with respect to each other.

14. The charging device of claim 13, wherein the power tool battery interfaces within the second subset receive power in series with respect to each other.

15. The charging device of claim 13, the plurality of coupling components comprising a front row of at least two coupling components aligned with each other in a direction parallel to a front surface of the charging device and a rear row of at least two coupling components aligned with each other in the direction parallel to the front surface of the charging device.

16. The charging device of claim 13, further comprising:
   a first electronic board that provides power to the first subset; and
   a second electronic board that provides power to the second subset.

17. The charging device of claim 13, a first power tool battery interface of the plurality of power tool battery interfaces defining a battery mounting direction along which the rechargeable power tool battery slides with respect to the first power tool battery interface when the rechargeable power tool battery is being mounted, wherein the battery mounting direction is vertical.

18. The charging device of claim 13, comprising a handle that extends upward from the housing away from the plurality of coupling components, the housing slides in a first direction to slideably engage with the modular unit, the handle defining a longitudinal axis that is generally parallel to the first direction.

* * * * *